United States Patent [19]

Hunter

[11] Patent Number: 5,495,161
[45] Date of Patent: Feb. 27, 1996

[54] SPEED CONTROL FOR A UNIVERSAL AC/DC MOTOR

[75] Inventor: Erick D. Hunter, Centerville, Ohio

[73] Assignee: Sencorp, Newport, Ky.

[21] Appl. No.: 177,463

[22] Filed: Jan. 5, 1994

[51] Int. Cl.[6] .................................................. H01P 7/00
[52] U.S. Cl. ........................... 318/807; 318/809; 318/245
[58] Field of Search ...................................... 318/244, 245,
318/807, 809–811; 388/911

[56] References Cited

U.S. PATENT DOCUMENTS

| | | |
|---|---|---|
| 3,599,064 | 8/1971 | Friedman . |
| 4,326,153 | 4/1982 | Contri . |
| 4,348,625 | 9/1982 | Sharp .................................. 318/757 |
| 4,412,163 | 10/1983 | Angersbach ....................... 318/600 |
| 4,481,448 | 11/1984 | Bishop ............................... 318/248 |
| 4,556,830 | 12/1985 | Schwalm et al. . |
| 4,622,500 | 11/1986 | Budelman, Jr. . |
| 5,189,349 | 2/1993 | Haga .................................. 318/254 |
| 5,223,772 | 6/1993 | Carobolante ....................... 318/254 |

FOREIGN PATENT DOCUMENTS 338257  3/1989  European Pat. Off. .
2000716  1/1979  United Kingdom .

OTHER PUBLICATIONS

Motorola Semiconductor Technical Data Book, TDA1185A. pp. 4–7, and 4–125 to 4–133. no date.
Tal, Speed Control by Phase Locked Servo Systems, IEE Transactions on Industrial Electronics and Control Instrumentation, vol. IECI 24 No. 1 Feb. 1977 pp. 118–125.
Margaris et al., Phase Locked Speed Regulation of Universal Motors, Int. J. Electronics, 1983, vol. 55, No. 6 pp 843–850.

Primary Examiner—Brian Sircus
Attorney, Agent, or Firm—Jerrold J. Litzinger

[57] ABSTRACT

A series universal AC/DC motor is controlled by switching the phase angle of an AC signal with a triac power switch in response to a motor control providing a phase-locked loop velocity control. A speed command circuit provides a reference frequency corresponding to a selected motor speed. The reference frequency is compared to a feedback frequency representing actual motor speed. An error signal representing the phase difference between the reference and feedback frequencies is compared to a ramp signal produced by the AC power source, and a resulting trigger pulse is used to control the triac power switch, thereby regulating the speed of the motor.

12 Claims, 13 Drawing Sheets

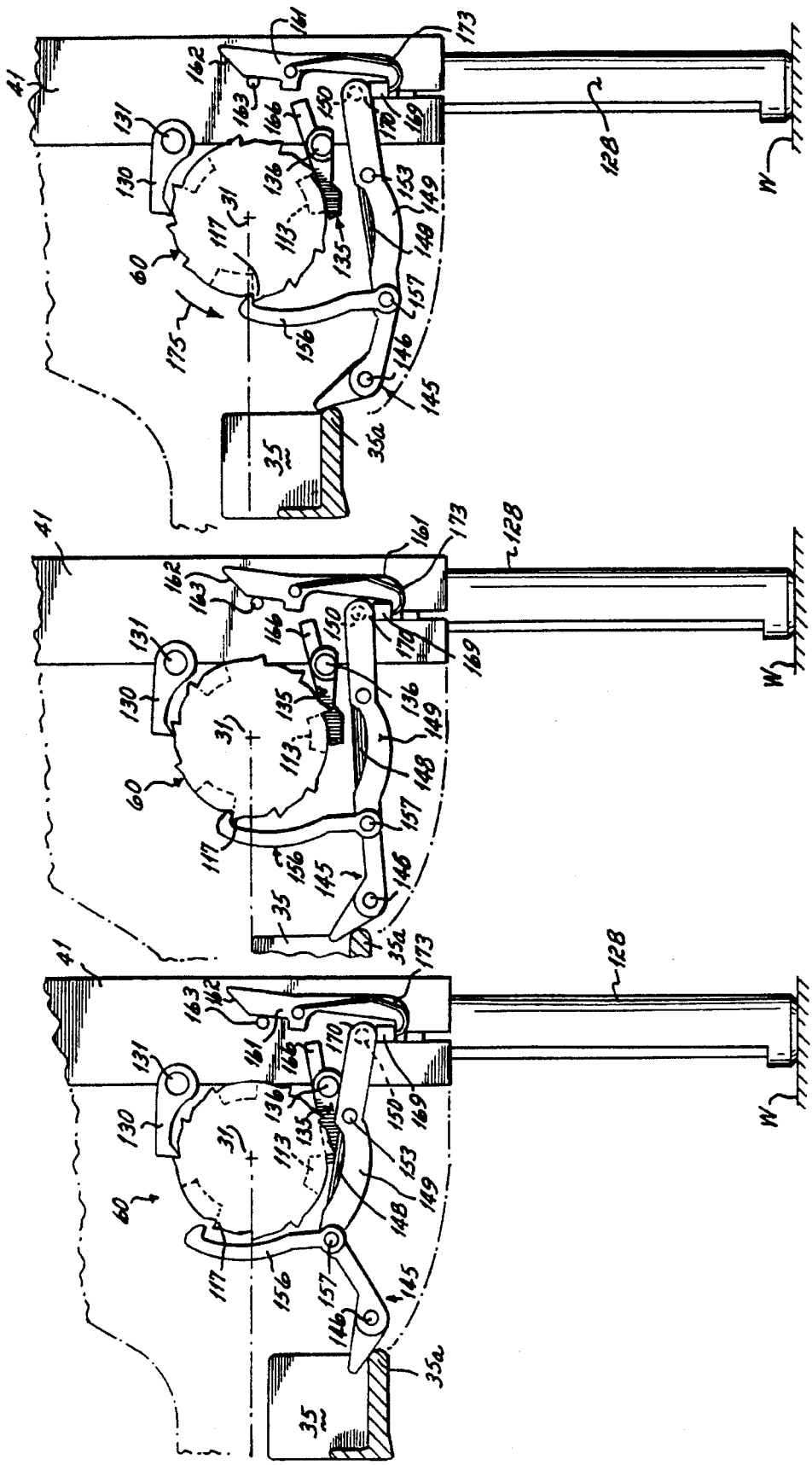

SPEED CONTROL FOR A UNIVERSAL AC/DC MOTOR

BACKGROUND OF THE INVENTION

This application is related to applicant's copending U.S. patent application Ser. No. 08/177,840 entitled FLYWHEEL-DRIVEN FASTENER DRIVING TOOL AND DRIVE UNIT filed on even date herewith and naming as inventors J. Crutcher, D. Lucas, D. D'Amico and E. Hunter.

This invention relates to an apparatus for controlling electric motors. While the invention has many varied applications, it will, for the purpose of clarity, be described herein as used to control a motor mounted to drive the flywheel of a fastener applying tool. This description is by way of example only, and it will be appreciated that the invention has many varied uses and applications in motor control.

In the past, where relatively large energy impulses are needed to operate a fastener driving tool (such as a nailer or stapler) for framing purposes, for example, it has been common to power such tools pneumatically. Pneumatic fastener driving tools, which require a job site compressor, are well known. Such tools are capable of driving a nail or staple of 3" or longer into a framing wood, such as 2×4s, for example.

Electrically driven tools, such as solenoid operated fastener driving tools, are also well known. These are primarily used in lighter duty applications such as in driving one inch brad nails, for example, rather than the larger 2" to 4" staples or nails used in framing.

Considerable thought and effort has been expended in providing a heavy duty, i.e. high powered, fastener driving tools without relying on a compressor. One alternative approach is employing flywheels as a means to deliver kinetic energy sufficient to power a heavy duty fastener driver. Examples of such systems are disclosed in U.S. Pat. Nos. 4,042,036; 4,121,745; 4,204,622 and 4,298,072 and in British Patent No. 2,000,716.

While a great deal of time has been expended in the development of flywheel driven fastener driving tools, nevertheless, such tools still present their own unique problems. For example, in tools utilizing two flywheels, it has been the practice to provide a separate electric motor for each flywheel. The two motors add considerable weight and bulk to the tool and are difficult to synchronize. Another approach is to mount one of the flywheels on the electric motor shaft and then drive the second flywheel through a series of belts or chains and pulleys. Such drives are complex, difficult to adjust and are subject to wear.

Another problem area in such tools involves the apparatus to cause one of the flywheels to move toward and away from the other. Preferably, for example, a movable flywheel is shifted into an operative position with an adjacent flywheel wherein its periphery is spaced from the periphery of the stationary flywheel by a distance less than the nominal thickness of the thick part of the driver, so to punch and thrust the driver between the two wheels. The movable flywheel is then shifted in the opposite direction to an inoperative position wherein its periphery is spaced from that of the fixed flywheel by a distance greater than the greatest nominal thickness of the driver, so the drive can be returned for another stroke. Heretofore, systems to bring about this shifting of one of the flywheels with respect to the other have been cumbersome, complex and not altogether satisfactory.

Yet another area of concern in these tools is directed to the means for returning the driver to its normal, retracted position from the end of the drive stroke. Complex systems of springs, pulleys and elastomeric cords have been developed. Such systems, however, have proven to be subject to wear, stretching and deterioration due to stresses and to lubricants and foreign materials within the tool housing. Where a spring is used, the extent of its stroke or travel has been too great, and the spring fails early, requiring replacement. Other systems have employed a powered return roller and an idler roller which shifts a free floating driver to its normal position after the drive stroke. These systems were also found to be less than satisfactory.

In addition to these concerns, the nature in which such tools are used presents additional problems when the use of flywheels, as energy devices, is considered. Specifically, when a flywheel-powered tool is fired or cycled, energy is transferred from the flywheel to the fastener driver or ram, for example, for driving a fastener. In essence, the flywheel is rotated at a speed which provides sufficient rotational inertia such that, when coupled to the fastener driver, there is sufficient power to drive a long framing fastener into a target. For example, a typical framing fastener is about 3½" to 4" long and may require up to 50 horsepower to drive it full length into wood.

When a flywheel is used to drive a fastener, the energy used is apparent in a reduction of the desired initial or starting flywheel speed. That desired or initial speed must be regained before a fastener driving operation at the same power can be repeated. The time intervals, however, needed to accelerate the flywheel back up to the desired or set speed may lag far behind the frequency with which the user desires to set another fastener. In other words, physical limitations of the known flywheel energy systems in such tools limit the frequency or repetition rate with which they can be used.

While a flywheel energy system might be designed to deliver several energy impulses of similar power but over increasing time increments, as the wheel winds down, such functioning as a practical matter is difficult to control. It is thus desirable to provide a flywheel-operated tool where a flywheel is accelerated very quickly to its desired or initial speed and within the time interval required by normal use frequencies.

An associated consideration is that the desired speed to which the flywheel is accelerated is repeatably and consistently regained and accurately regulated. Overshoots, undershoots or drifting of the desired speed result in overpowered or underpowered fastener driving which sets fasteners either too deeply or not deeply enough.

Another consideration in fastener driving is the variation both in length or configuration of fasteners and the variation of materials into which fasteners are driven. It is desirable that a heavy duty fastener driving tool be adjusted to accommodate such variations, yet at the same time be capable of quickly and consistently repeating a fastener driving operation within the selected range of operation.

More specifically, given the mechanical and dimensional specifications of the flywheel and knowing the driving forces which must be applied by the tool, the range of required angular speeds of the flywheel can be determined. In order to achieve the necessary consistency and repeatability of the driving action without overdriving or underdriving the fastener, the speed of the electric motor connected to the flywheel must be regulated within ±1%. A typical selectable range of angular velocities of the motor required by the range of driving forces, is from 7,000 revolutions per minute (rpm) to 15,000 rpm, when used with flywheels, for example, weighing 0.87 pounds and having a movement of inertia of $4.016 \times 10^{-4}$ ft. $-$lbs.sec$^2$. Further, when the tool drives a fastener, the kinetic energy is expended and the speed of the flywheel is reduced. The motor must be accelerated back to the selected speed within 500 milliseconds. It is also necessary that the motor and its control be immune from a high noise environment, for example, both radiant and power line noise may be created by other high power equipment and brush noise within the motor itself. In addition, the driving tool is often used in environments of temporary power hook ups in which significant voltage fluctuations are frequent and severe. The motor and its control must have minimum weight and cost in order to be commercially viable in a portable hand-held tool.

It is known that there are currently many motor speed controls for different types of motors. For example, a Motorola TDA 1085C is an integrated circuit component providing a universal motor speed control which uses triac phase angle control with a voltage comparison velocity feedback loop. There are many references to motor speed controls utilizing phase locked loops primarily for the control of brushless DC motors. The theory and feasibility of using a phase locked loop in the control of universal AC/DC motors in lieu of phase angle control is also known. Further, there are existing portable hand held tools in which speeds are selectable. However, those systems typically are open loop in nature and do not require a precise closed loop speed control. Such open loop speed control systems may be obtained by switching power to the motor between a half wave and a full wave power supply or switching selected motor coils into and out of the circuit or by mechanical gearing. Further, portable hand held tools which are battery powered typically pulse width modulate current to a permanent magnet field coil motor.

None of such known circuits are capable of providing a speed control for a universal AC/DC motor useful in a hand-held portable device with the speed range, precision and response time requirements of the present invention.

Consequently, heretofore there has not been available in the industry a reliable, lightweight and relatively simple electromechanical fastener driving tool which can efficiently, consistently and repeatably drive fasteners of various sizes, and particularly those sizes needed in heavy duty framing applications.

A further consideration with electric tools, particularly with flywheel-operated or other hand tools, is the weight and expense of the drive unit. Motors with sophisticated speed controls can be very heavy and expensive. It is thus desirable to provide fastener driving tools or drive units for tools, implements or other devices with relatively lightweight, speed controlled motors at a relatively low cost.

With hand-held or hand-operated tools, it is desirable not only to provide a relatively lightweight energy source, but to provide a tool or implement which is balanced. In the prior application identified above, a fastener driving tool is powered by a flywheel driven by a motor, where both flywheel and motor are located in the forward end of the tool. The center of gravity of such a device is forward, and it is difficult to balance the tool. On the Other hand, moving the motor away from the flywheel requires a coupling or extended drive which increases tool weight, and drains effective power. This may require a larger motor with the attendant weight increases. It is thus desirable to provide an improved, well-balanced hand-held fastener driving tool, and a drive unit facilitating the balance of such hand-held tools.

While the noted considerations are important to fastener tools and their particular application, the operation of many tools, implements and devices requires the application of a motive force or energy pulse to a working member. Many such apparatus require only a short or limited motion of such an implement or member to accomplish a task. Currently, in addition to the flywheel and pneumatic systems noted above, such apparatus are powered electrically, or hydraulically, by motors or solenoids, for example, by internal combustion devices, springs or other devices. By way of example only, devices other than fastener driving tools which require or utilize various energy sources to move a working member include: paper punches, diverse material punchers, shears, cutters, pruners, wrenches, stitchers, riveters, pulverizers, tampers, aerators, slippers, chisels, material handling devices, hammers, hammer drills, embossers, pumps, coining devices, clamps, and tools or implements for many other applications. It is desirable to provide an improved drive or power unit for such tools.

One object of the invention is to provide a low cost, reliable and light weight motor control which provides accurate speed control for a motor.

A further objective of the invention is to provide a motor control having a wide range of motor speeds selectable by an operator and the capability of automatically and rapidly accelerating back to a selected speed after a loss of speed caused by the imposition of a load on the motor.

A further objective of the invention to provide an improved apparatus for delivery of an energy pulse to a working member.

A further objective of the invention has been to provide an improved apparatus for delivering an energy pulse from a flywheel to a fastener driver or to the working member of a tool or implement.

A further objective of the invention has been to provide a motive apparatus and a control therefor for driving a flywheel at a selected speed, and for regaining that speed quickly after a speed reduction.

A further objective of the invention has been to provide an improved flywheel-driven fastener driver capable of producing desired energy pulses at desired cycle frequencies.

A further objective of the invention has been to provide an improved portable hand-held power tool.

To these ends, one preferred embodiment of the invention comprises a power or drive unit in operative disposition in a fastener driving tool. A flywheel is mounted in a tool housing and a handle extends rearwardly from the housing with a motor for driving the flywheel being mounted at a distal end of the housing. A drive shaft coupled to the motor has a pinion with spiral bevel gear teeth meshing with similar teeth on the flywheel. The motor weight at the handle's rear end tends to balance out the tool housing and its components so the entire tool feels balanced.

A drum is mounted in the housing. It includes a first circumferential surface. A first drive cable is secured to the drum so as to be wound up on the surface when the drum rotates. A cone clutch is utilized to selectively and intermittently interconnect the flywheel to the drum to impart a pulse of energy to the drum to rotate it and wind up the cable onto the drum. The other end of the cable is attached to a fastener driver. When the drum is rotated, the cable is wrapped onto the drum, and pulls the driver to engage and drive a fastener. The energy stored in the flywheel is thus delivered to the fastener through the drum, cable and fastener driver.

Another or a second circumferential surface, having a diameter preferably smaller than the first circumferential surface, is operatively secured to the drum. A second, or return, cable is attached to the second surface and is wound thereabout when the drum is rotated by the flywheel. The other end of the second return cable is attached to a coil spring which is compressed when the return cable is wound up. After the clutch disengages the drum from the flywheel, this spring expands to tension the second return cable, reversing the drum and pushing the first cable and fastener driver back to a start position. Since the return cable wind-up surface is of less diameter than the drive cable surface, the second return cable does not traverse so much distance as the drive cable when the drum is actuated by the flywheel and clutch. The spring travel is thus held within a range which does not unduly stress or fatigue the spring despite extensive cycling of the tool.

Trigger actuated linkage and an axially expansible actuator serve to actuate the clutch to momentarily interconnect the flywheel to the drum. The actuator is similar in structure and operation to the prior application incorporated by reference herein.

An relatively simple and inexpensive AC/DC motor is used. A control operates the motor at a selected speed depending on fastener length and configuration and on target parameters. The control serves to accelerate the motor, and the flywheel back to an initial speed with only a very short delay of about 500 milliseconds; well within the period of the desired frequency of use.

The speed of the universal AC/DC motor is controlled by switching the phase angle of an AC signal with a triac power switch in response to a motor control providing phase-locked loop velocity control. The triac power switch is connected between the source of AC power and the motor and has a trigger input for controlling the application of the AC signal to the motor. An analog reference circuit is responsive to the AC signal and initiates a ramp signal with each zero crossing of the AC signal. The ramp signal has a duration approximately equal to the duration between zero crossings of the AC signal.

A speed command circuit provides a speed command signal having a reference frequency representing one of several selectable desired speeds of the motor. A feedback circuit is responsive to rotation of the motor and produces a feedback signal having a feedback frequency representing the actual speed of the motor. A phase detector produces an error signal representing the phase difference between the speed command and the feedback signals which is averaged by a low pass filter. A comparator produces a trigger pulse to the triac power switch during each occurrence of the ramp signal as a function of the detected phase difference, The leading edge of the trigger pulse occurs at a time during the ramp signal that is determined by the phase difference between the reference and feedback frequencies. The trigger pulse switches the triac as a function of that phase difference, and the AC signal is applied to the motor to lock the phase of the speed command and feedback signals thereby maintaining the actual motor speed equal to the desired motor speed.

A fastener driving tool embodying the invention may also include a fastener magazine which is not only inclined, but curved, and which extends rearwardly toward the motor on the handle's rear end, from a forward position below the driver, partially encircling the handle, and helping balance the tool.

The power or drive unit such as described can be used with various tools, implements or other devices to impart a pulse of energy to a movable or working member thereof. Such a unit includes the motor, motor control driveshaft, flywheel, drum, drive and return cables, clutch trigger linkage, and clutch actuator. Where the balance and/or portability is of no concern, the motor may be mounted to directly drive the flywheel. A hand tool embodying the invention may also include a tool housing, a handle extending therefrom, a motor in a distal end of the handle and a shaft through the handle coupling the motor to a flywheel in the housing, together with a control for accelerating the motor and flywheel to predetermined speeds in a minimum time period.

The present invention has the advantage of providing very accurate speed control of the motor and a very fast response to speed deviations from a selected speed. A further advantage is realized because the frequencies of the speed command and feedback signals are less susceptible to noise. A further advantage is that the above features are provided by a low cost, light weight and reliable motor control.

These and other objectives and advantages will become readily apparent from the following detailed description of the invention, and from the drawings in which:

FIGS. 9A–9C are illustrations of operating sequences of the components of the tool of FIG. 1 when the WCE is first engaged and thereafter the trigger is engaged to cycle the tool;

MECHANICAL STRUCTURE

Figure 5:
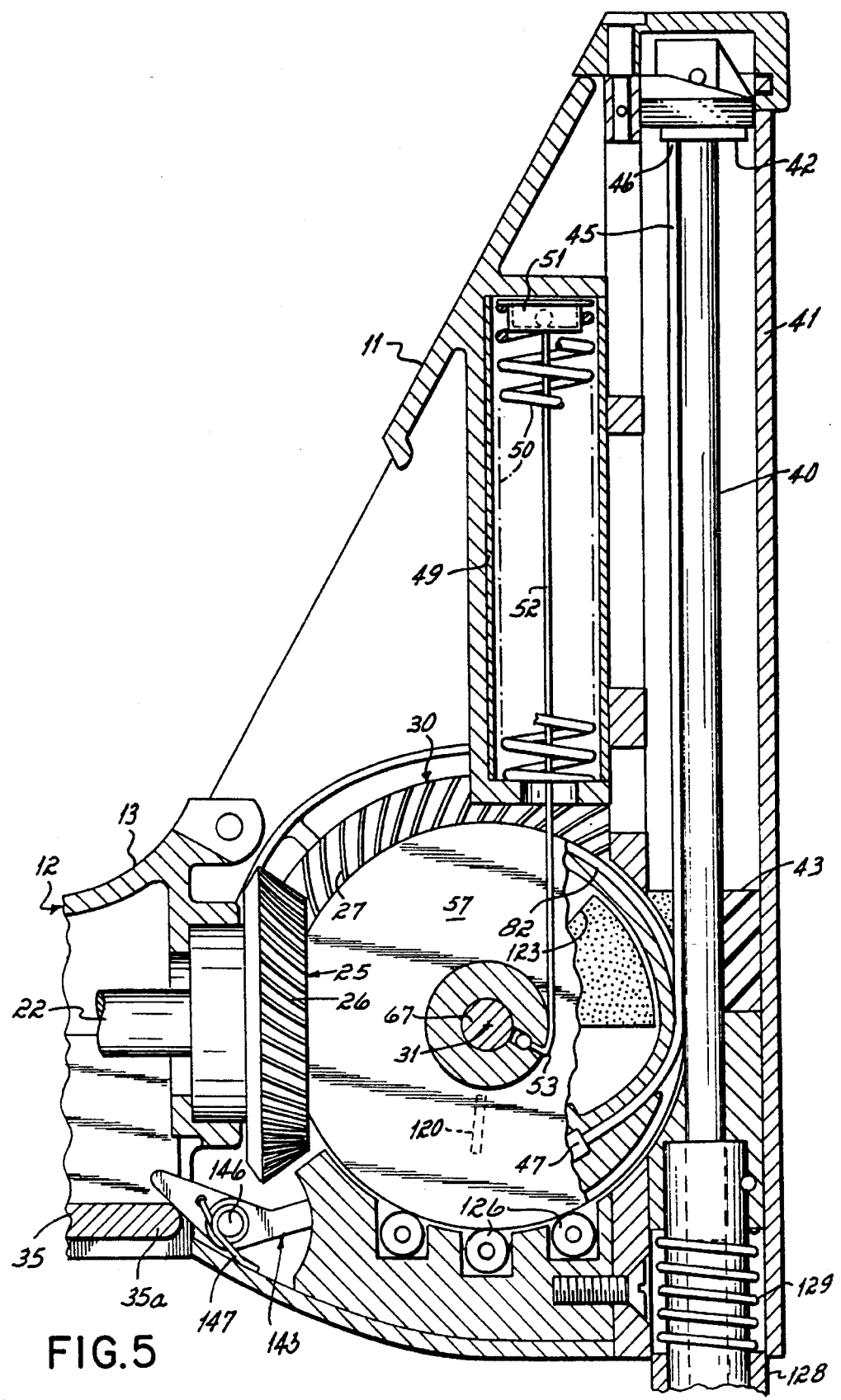
FIG. 5 is a cross sectional view taken along lines 5—5 of FIG. 4.
Figure 5A:
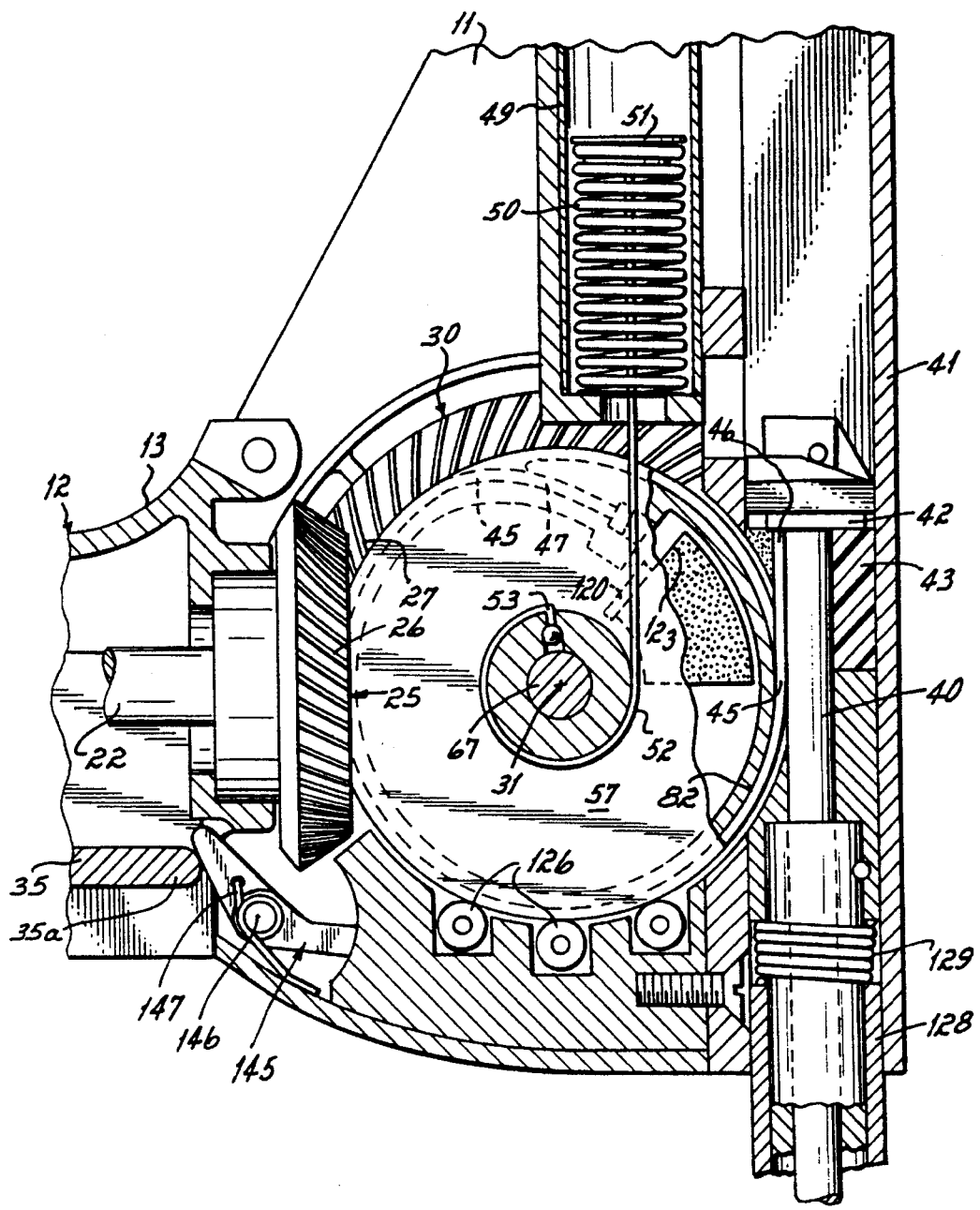
FIG. 5A is a cross sectional view taken along lines 5A—5A of FIG. 4A, but illustrating the tool after clutch engagement in a fully fired condition.

Turning now to the drawings, there is illustrated in the Figures a preferred embodiment of the invention in the form of a fastener driving tool 10 for driving fasteners such as nail "N" (FIG. 5A) into 2×4s "W" (FIG. 5A). It will be appreciated that the preferred embodiment of the invention includes a motor control which can be used with motors of a variety of tools or implements having working elements or members which must be powered to move through a stroke, such as, for example, the driver of tool 10. The tool 10, however, includes a housing 11, a handle 12 having a forward end 13 and a rearward end 14 and a magazine 15. The magazine 15 is mounted to the rear end 14 of handle 12 and to the forward end 17 of the tool housing 11 by a bracket 19. Bracket 16 serves as a foot for supporting the tool in an upright position when set on a horizontal surface.

Figure 2:
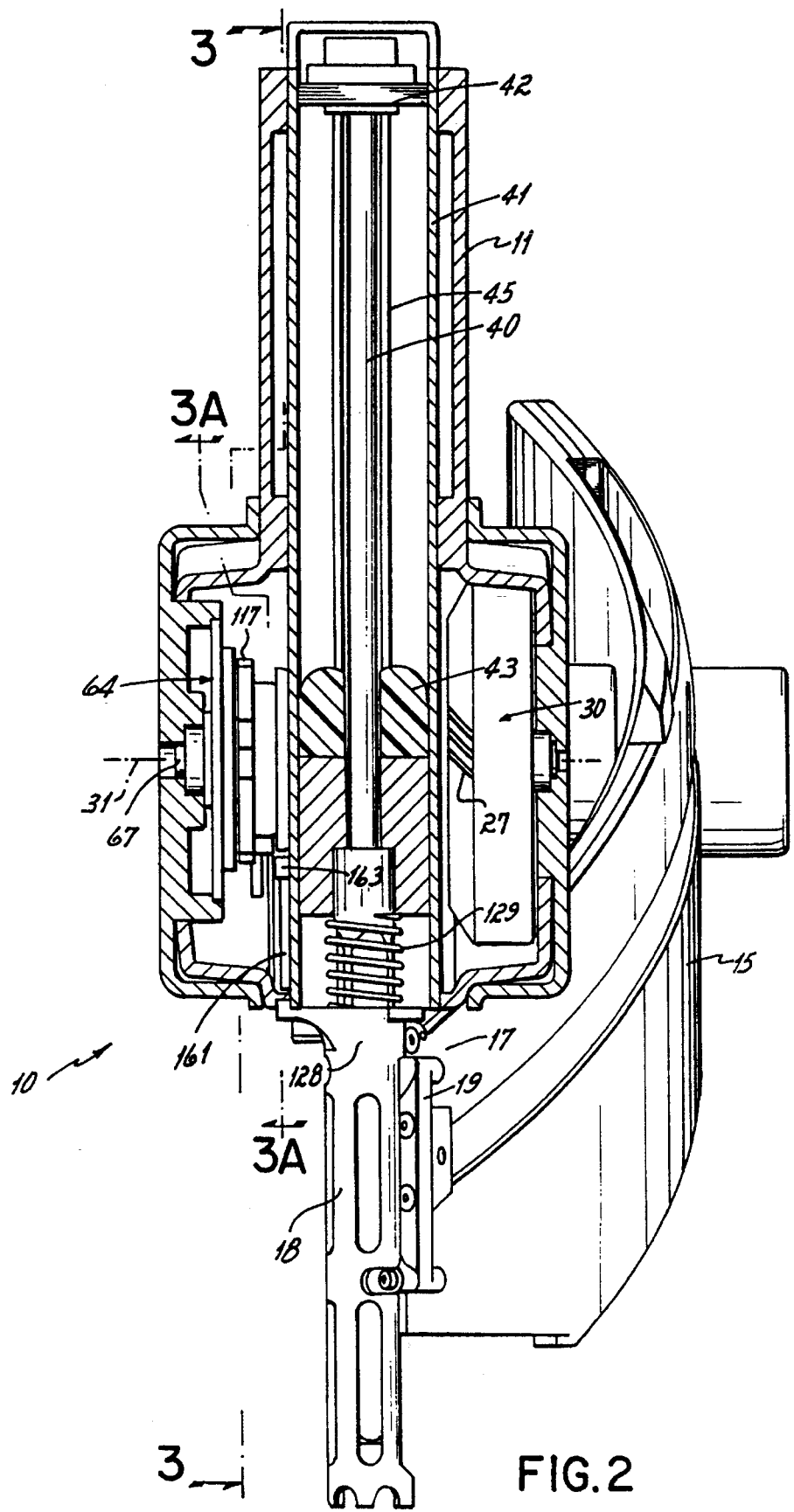
FIG. 2 is a front elevation view of the tool of FIG. 1 in partial cross-section taken along line 2—2 of FIG. 1, taken generally on line 3—3 of FIG. 2.

In FIG. 2, the magazine 15 is shown in more detail. It will be appreciated that the magazine is curved from front to back and is also inclined. A forward end of the magazine is interconnected with the nose piece 18 of the tool, by means of a bracket 19. The magazine is operable through this interconnection to deliver fasteners, one after the other, to a position or driving station in the nose piece area from which the fasteners can be driven upon cycling or operation of the tool. Fasteners are delivered from the magazine seriatim to the driving station at the end of the driver for driving into a target.

It will be appreciated that the curved configuration of the magazine extends the magazine outwardly around the left side of the handle 12. The handle can still be grasped in either the right or the left hand of the user.

Returning to FIG. 1, it will be appreciated that a motor "M" is located in the rear end 14 of the handle 12 and is connected by an appropriate wires, such as shown at 20, to a source of electricity for running the motor. A speed display and a thumbwheel or other motor speed selector is located on the housing 11 in the general area designated by the numeral 21, so that a user of the tool can select a predetermined speed, depending on the length and configuration of the fastener to be driven and the parameters of the target into which it is to be driven.

Of course, the magazine 15 is spring biased to urge fasteners, such as nails or staples, serially one after the other, toward and into position at the nose piece 18 for driving by the tool's driver.

Figure 1:
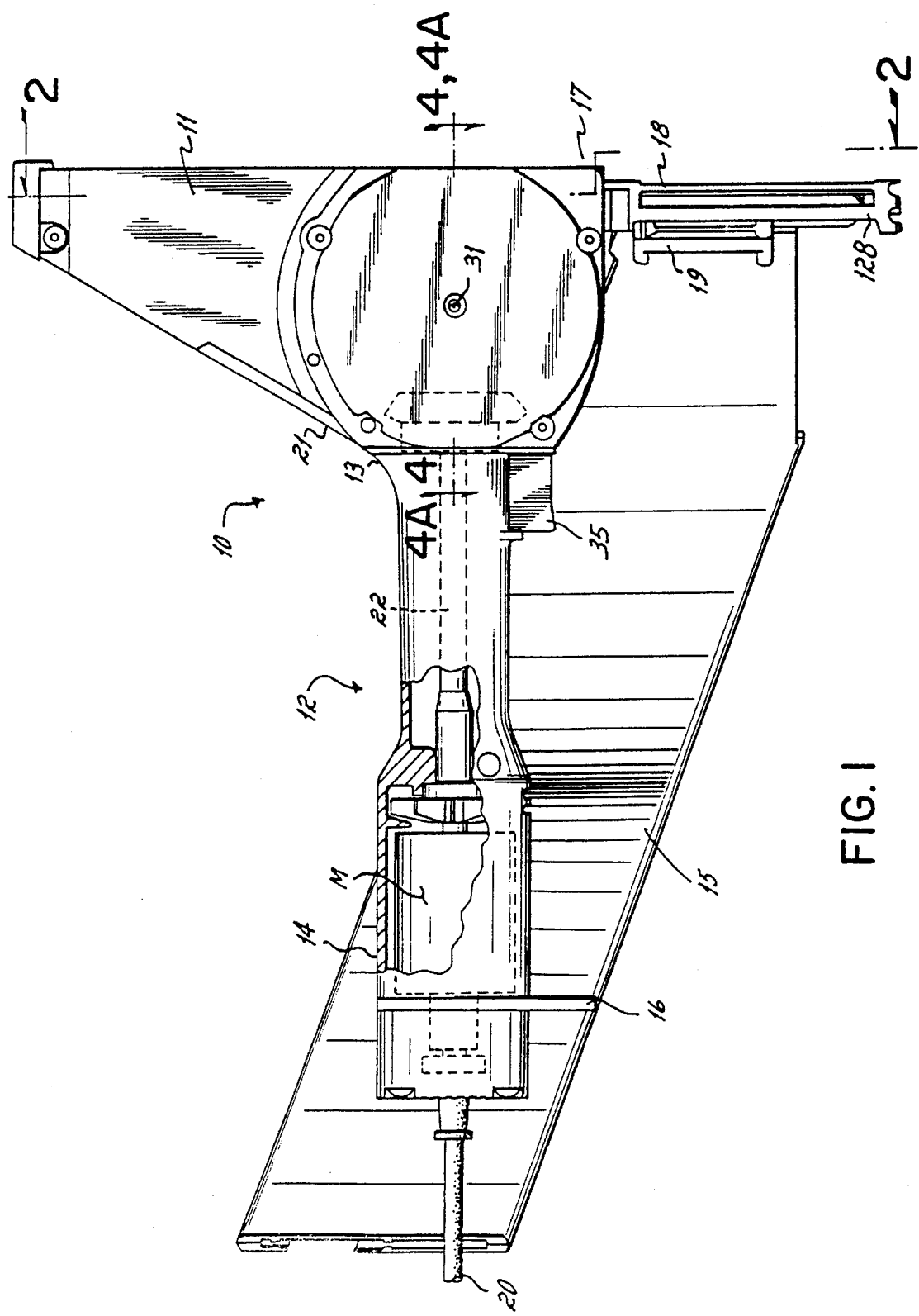
FIG. 1 is a side elevation view of a fastener driving tool embodying the invention.

As noted herein and as will be explained in detail, the tool is energized by a rotating flywheel, not shown in FIG. 1, which is driven by the motor "M" at the rear end 14 of the handle 12. A driveshaft 22 is interconnected between the motor and the flywheel for purposes of rotating the flywheel when the motor is electrically driven. The driveshaft 22 extends through the handle 12 from the motor "M" at the rear end 14, through the front end 13 of the handle, and to the flywheel mounted in the housing 11, as will be further described.

Figure 3:
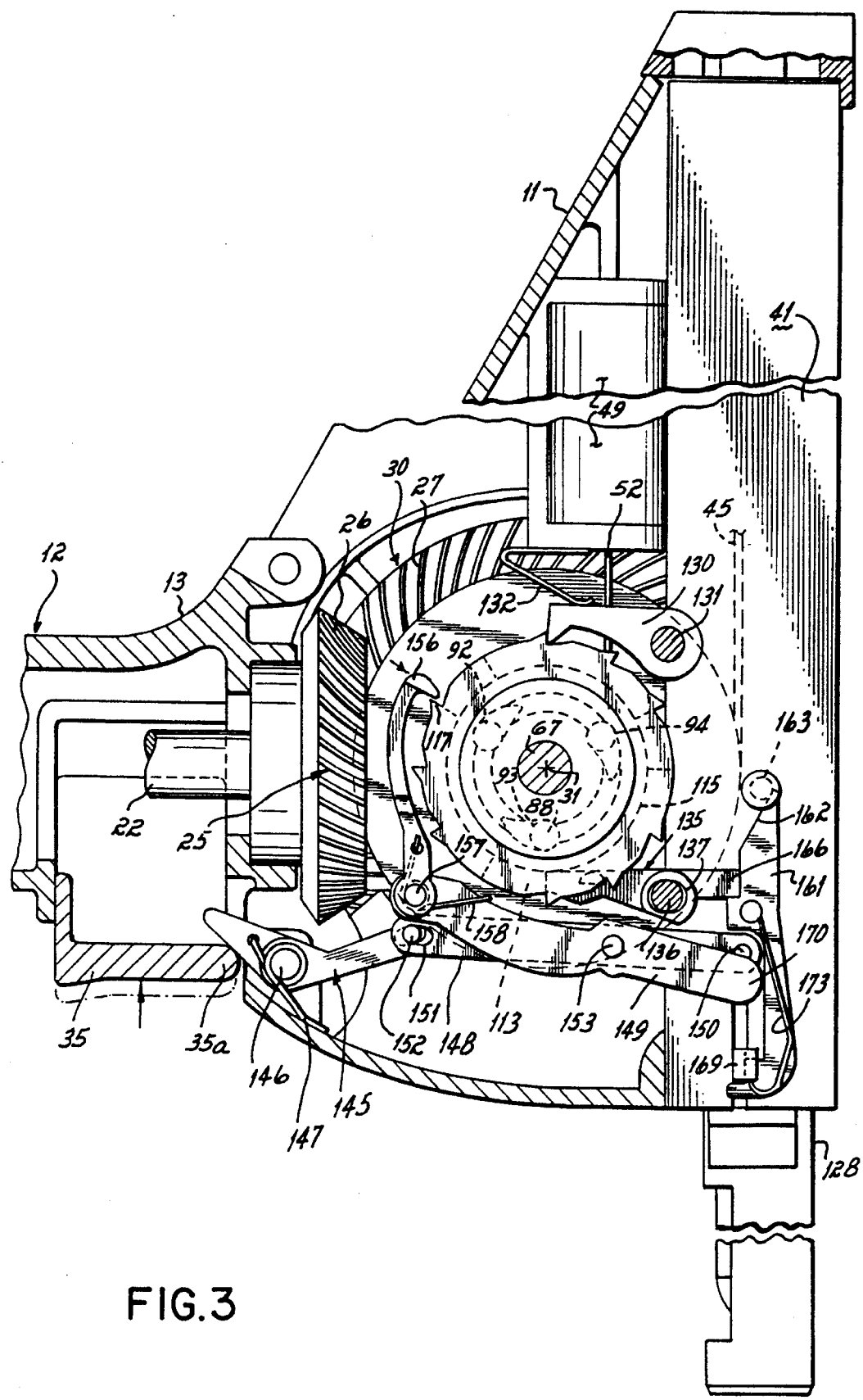
FIG. 3 is an enlarged side view in partial cross-section of the tool of FIG. 1, taken generally on line 3A—3A of FIG. 2.

Turning now to FIG. 3, there is shown in partial cross-section, certain of the interior components of the tool. These include a pinion 25 secured to the end of bearing-supported driveshaft 22. The pinion 25 is provided with spiral bevel gear teeth 26. Pinion 25 is mounted so that the teeth 26 intermesh with corresponding spiral bevel gear teeth 27 on a flywheel 30, mounted for rotation on an axis 31. The tool 10 also includes a preferably mechanical trigger 35, which may be depressed in the direction of the arrow shown in FIG. 3 to actuate or cycle the tool 10. It will be appreciated that the motor at the rear end 14 of the handle 12, when energized, constantly drives the driveshaft 22 and the pinion 25, which spins the flywheel 30 in a clockwise direction as viewed in FIG. 3. The motor is thus directly coupled to the flywheel.

Figure 4:
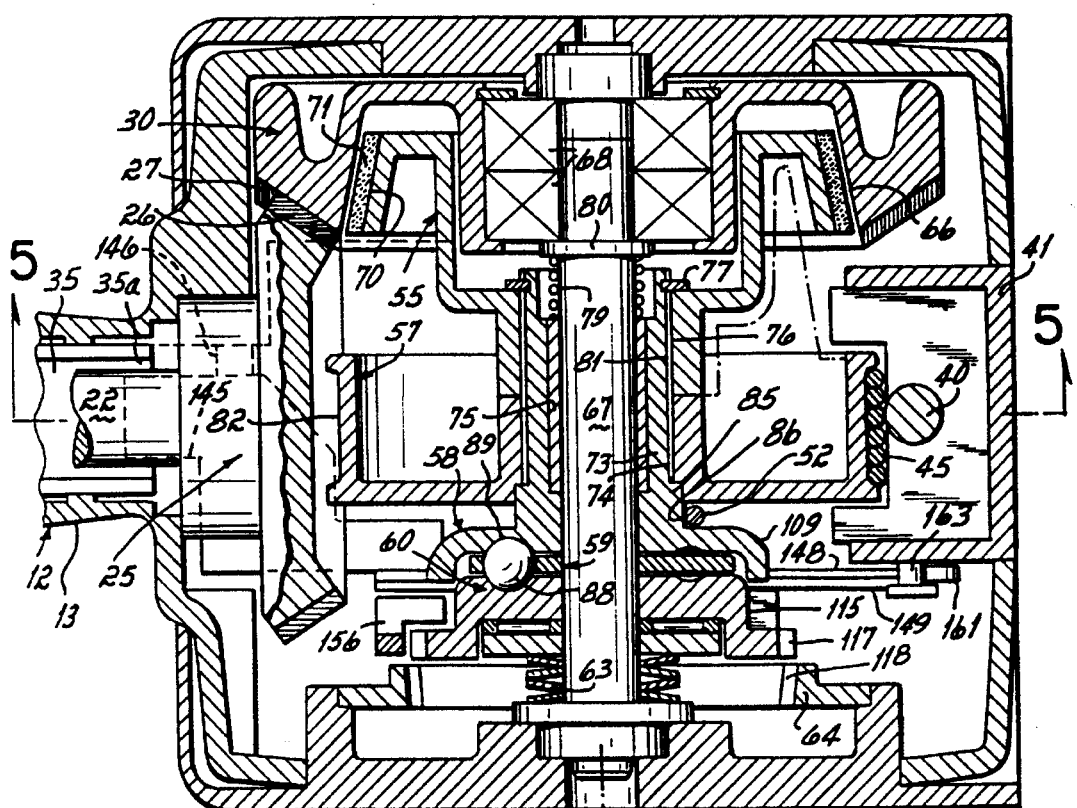
FIG. 4 is a cross-sectional view taken along lines 4—4 of FIG. 1, showing the tool in an unfired condition.
Figure 4A:
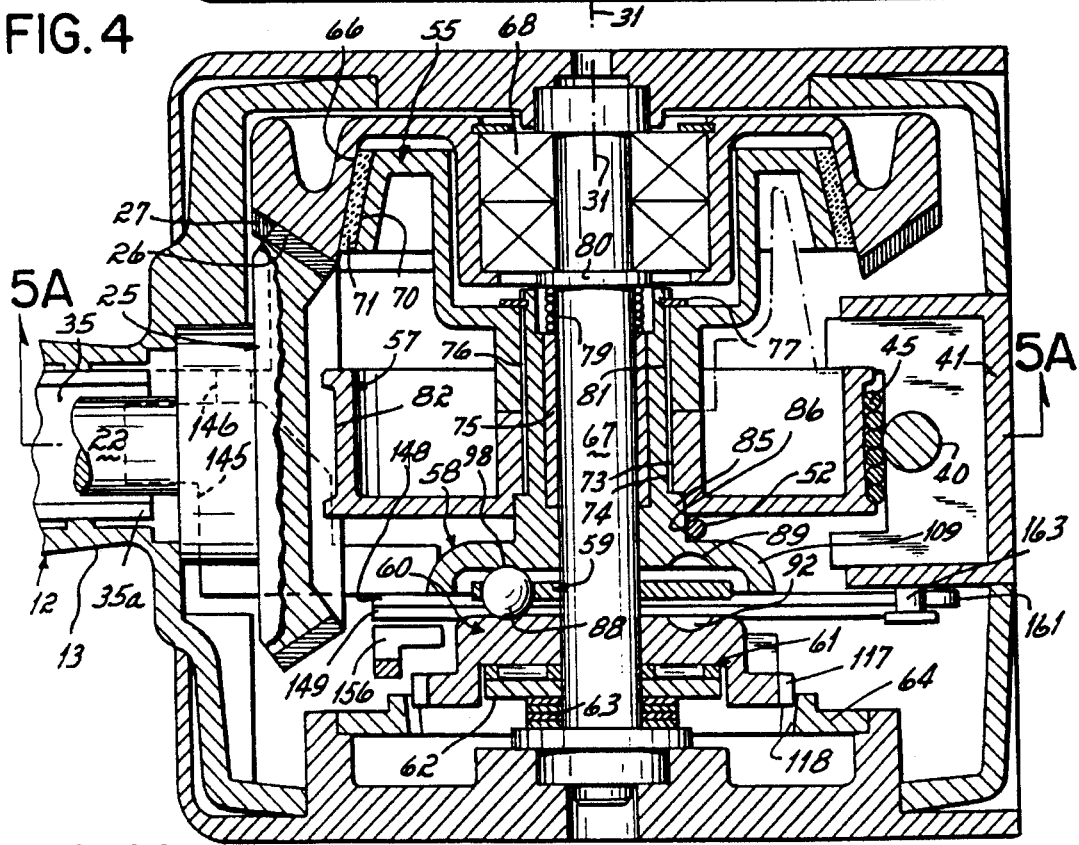
FIG. 4A is a cross-sectional view like FIG. 4 taken along lines 4A—4A of FIG. 1 showing the tool just as the clutch is initially engaged.

Turning now to FIGS. 5 and 5A, and as partially seen in FIGS. 4 and 4A, the tool 10 further includes a fastener driver 40 mounted for reciprocation in a vertically disposed tube 41 at the forward end of the housing 11. The elongated driver 40 may be of any suitable shape, such as a round rod or bolt, or a rounded rod generally "C"-shaped or "D"-shaped in cross-section similarly to the head of a fastener to be driven; or the fastener driver 40 may be flattened and rectangular in cross-section, or of any other suitable configuration. The tool further includes a stop 43 for the driver 40 and the coupling 42 (FIG. 2). The driver 40 extends from an attached coupling 42 at the upper end thereof.

A drive cable 45 is attached to the coupling 42 at an upper end 46 of the cable. The cable preferably is a flat ribbon comprising a multiplicity of strands bound in a plastic or synthetic material. Such a cable is available from the Orscheln Company, Moberly, Mo. The other lower end 47 of the cable is attached to the apparatus for driving the driver, as will be described.

The tool housing 11 further includes a sleeve 49 housing a return spring 50. An endcap 51 is connected to an upper end of the spring 50 and a return cable 52 is connected at its upper end to endcap 51. A lower end 53 of cable 52 is also interconnected with the driving apparatus to turn that apparatus to a prefired condition, as will be described.

Figure 7:
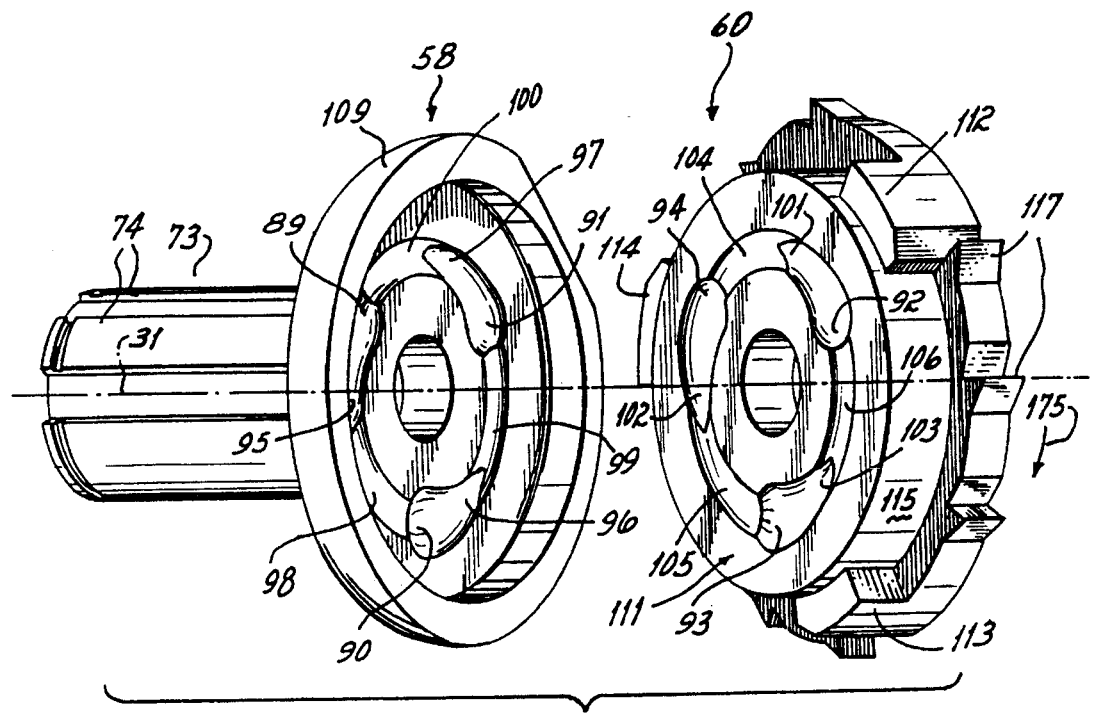
FIG. 7 is an expanded and enlarged view of actuator components of the tool of FIG. 1.
Figure 6:
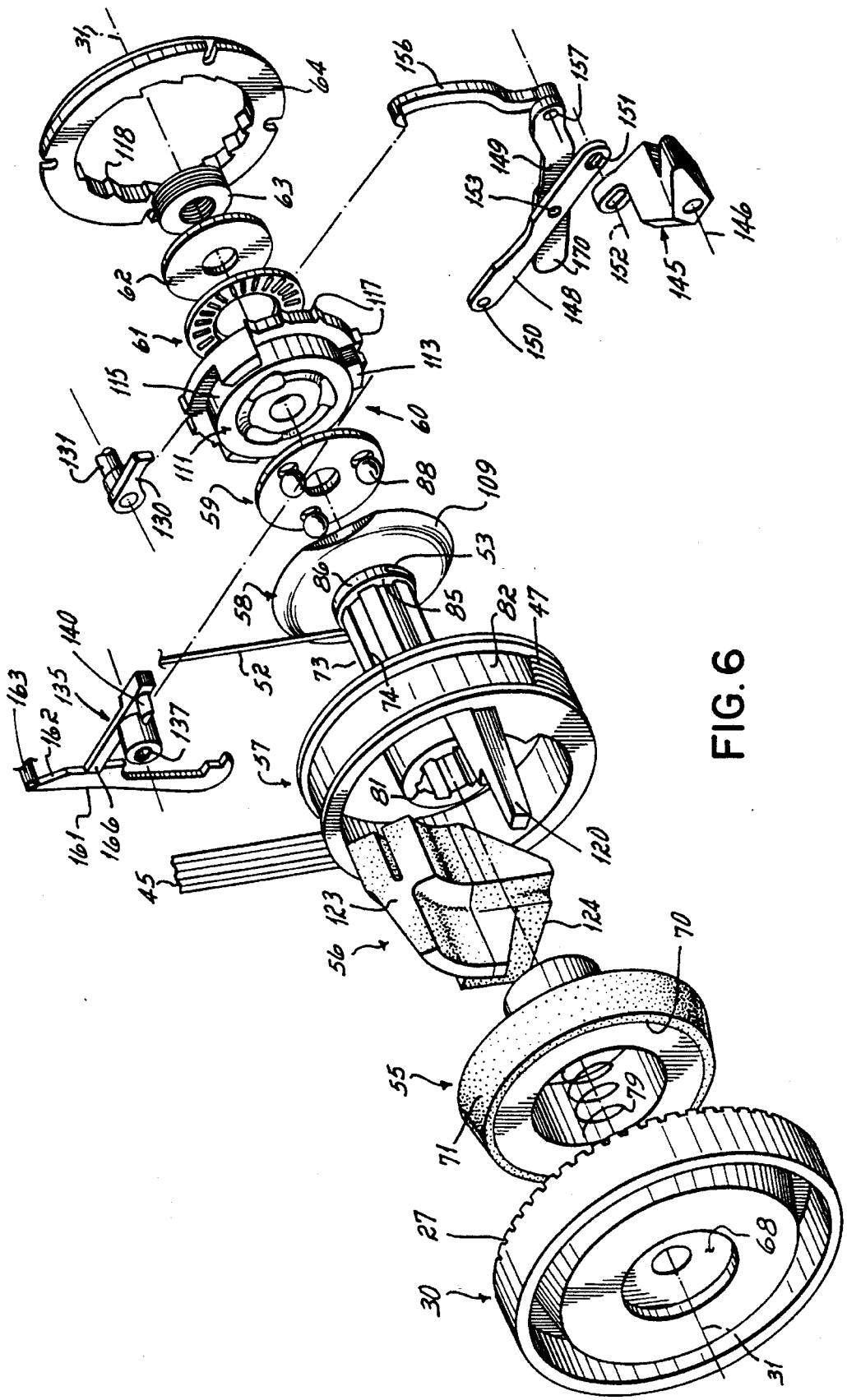
FIG. 6 is an exploded view of the flywheel, drum, clutch, actuator components and trigger linkages of the tool of FIG. 1.

Turning now momentarily to FIG. 6, there is shown therein, mounted on axis 31, a plurality of operational parts for the tool. Beginning with the flywheel 30 at the lefthand side of FIG. 6, there is shown in FIG. 6 a cone clutch member 55, a drum stop 56, a drum 57, an inner ball plate 58, a bearing cage 59, an outer ball plate 60, thrust bearing 61, a spacer washer 62, belleville springs 63 and a ratchet ring 64. While FIG. 6 shows these various elements in an expanded form, they are assembled on the axis 31, as perhaps best seen in FIGS. 4 and 4A, while details of the inner and outer ball plates 58 and 60 are also seen in FIG. 7.

With respect then to FIGS. 4, 4A, 6 and 7, it will be appreciated that the flywheel 30 is driven via the spiral bevel gears 27. The flywheel has a frusto-conical surface 66 (FIG. 4A) for receiving the cone clutch 55, and is mounted on an axle 67 by means of bearings 68 for free rotation about axis 31. The cone clutch includes a frusto-conical surface 70, faced with frictional clutch material 71. When the cone clutch 55 is pressed into the flywheel 30, the frictional material 71 engages the surface 66 in the flywheel so that the flywheel drives or rotates the cone clutch.

As perhaps best seen in FIGS. 4 and 4A, the inner ball plate 58 includes a tubular projection 73, which is provided with splines 74 (FIG. 6). This projection 73 with its inner ball plate 58 is mounted on axle 67 for rotation with respect thereto by means of a sleeve 75. The cone clutch 55 is provided with a plurality of internal splines 76, which intermesh with the splines 74 of the inner ball plate 58, so that the cone clutch 55 is mounted over the projection 73 in non-rotating relationship with respect thereto. The cone clutch 55 is maintained on the projection 73 by means of a snap ring 77. A spring 79 is mounted on axle 67 between the sleeve 75 and inner ball plate 58 on the one end, and a snap ring or retainer 80 on the other end, so that the cone clutch 55 and inner ball plate 58 are biased in an axial direction along axis 31, away from the flywheel 30 by spring 79. Drum 57 includes internal splines 81 and is also mounted on splines 74 of projection 73 extending from the inner ball plate 58 for rotation therewith. Drum 57 includes a circumferential cable receiving or wind up surface 82 for receiving drive cable 45.

Inner ball plate 58 is also provided with a projection or boss 85, defining a circumferential or cylindrical surface 86 for receiving and winding up the return cable 52. The diameter and circumference of cylindrical wind-up surface 86 is less than that of wind-up surface 82.

It will thus be appreciated from the description so far that when the cone clutch 55 is rotated by the flywheel 30, this engagement also drives the inner ball plate 58 and the drum 57, thereby winding up cable 45 on wind-up surface 82 of drum 57, and winding up cable 52 on surface 86 of the inner ball plate 58.

As illustrated in FIGS. 4 and 4A, and as further illustrated in FIG. 7, three ball bearings 88 reside in pockets 89, 90 and 91 in inner ball plate 58 and in corresponding pockets 92, 93 and 94, in outer ball plate 60. Of course, only one ball is shown in each of FIGS. 4 and 4A, in view of the sectioning of the drawings, and for clarity. As seen in FIG. 7, each of the pockets 89, 90 and 91 have a trailing ramp 95, 96, 97 respectively, each of which are inclined up to a respective race surface 98, 99, 100. As shown in FIG. 7, the pockets 92–94 of the outer ball plate 60 also have associated ramps 101, 102 and 103 tapered upwardly from the bottom of the pocket to respective races 104, 105 and 106. The inner ball plate comprises a concave-like shield 109. The outer ball plate 60 includes a boss-like projection 111 which has three dogs 112, 113 and 114 projecting radially from a circumferential surface 115 thereof. Moreover, the outer ball plate 60 also includes a plurality of teeth 117 projecting radially from an outer periphery of the plate.

When the respective pockets of the inner and outer ball plates 58, 60 are aligned, the ball bearings 88 therein are received within the pockets, so that the outer and inner ball plates are positioned relatively close together, as shown in FIG. 4, with the bearings 88 retained in cage 59. On the other hand, when the outer and inner ball plates 58 and 60 are rotated relative to each other, the resulting motion of the balls forces the two members apart, as will be further described.

As shown in FIG. 4A, when the plates 58 and 60 are forced apart, this action tends to both compress the belleville springs 63 and the spring 79 on the other side of the cone clutch 55, driving the cone clutch 55 into engagement with the flywheel 30, for the purpose of resulting in rotation of the inner ball plate 58 and the drum 57 by the flywheel 30, as will be described.

Returning now momentarily to FIG. 6, ratchet ring 64 is disposed on axis 31 closely adjacent the outer ball plate 60. When the tool is in the condition shown in FIG. 4, the outer ball plate 60 does not reside within the ratchet ring 64 and is not affected by that ratchet ring. In this position, the belleville springs 63 maintain the outer ball plate 60 away from the ratchet ring 64 in an axial direction. When, however, the ball bearings 88 force the inner and outer ball plates 58, 60 apart, the outer ball plate 60 moves axially toward and into the ratchet ring 64 so that the teeth 117 engage the internal teeth 118 of the ratchet ring 64 to prevent rotation of the outer ball plate 60 during a selective portion of the operating sequence. Also with respect to FIG. 6 and FIGS. 4 and 4A, it will be appreciated that a stop member 120 is interconnected with the drum 57 for interaction with the stop 56, as will be described.

Drum stop 56 includes preferably an elastomeric cushion 123 mounted on a bracket 124. Bracket 124 is adapted to slide into a portion of the forward structure of the tool housing 11 off to the side of tube 41, and is supported there so that the drum stop is supported in its position as shown, for example, in FIG. 5.

FIG. 5 illustrates various components of the tool in an unfired condition. In this position, the drum 57 has not been rotated and cable 45 extends from the drum, upwardly in tube 41 to the coupling 42, where the cable is attached to the driver 40. While the cable extends at its lower end into an appropriate slot or cutout in the drum for securing the cable thereto, such as by sliding an enlarged end of the cable into a slot cut into the drum, the cable runs upwardly alongside the driver in the tube 41. At the same time, spring 50 is fully expanded and the return cable 52 is not wound up on surface 86 of the inner ball plate. When the tool is actuated to drive a fastener, such as illustrated in FIG. 5A, the cone clutch is moved into engagement with the flywheel, which rotates the cone clutch and associated drum 57 in a clockwise direction, as shown in FIG. 5A. This wraps the drive cable 45 about the wind-up surface 82 on drum 57 and pulls the cable downwardly with rapid acceleration. Since the cable is attached to the driver 40 at its upper end, the cable pulls the driver down quickly, with this energy being used to drive a fastener as indicated in FIG. 5A. At the same time, the surface 86 of the inner ball plate 58 has been rotated to wind up the return cable 52. This tensions the spring 50 so that when the drive cycle is over, the spring 50 extends, pulling the cable 52. This imparts a counterclockwise rotation to the inner ball plate and the drum 57 to return the drum to its initial prefired condition and to raise the driver 40. Driver 40 is raised by this spring urging of the drum 57 and the unwinding of the cable 45 in an upward direction to push the driver 40 upwardly. The cable 45 and drum 57 may preferably be provided on three rollers or ball bearings 126, as shown in FIG. 5A. Thus, the unwinding of the drum 57, driven by the return spring 50, returns the driver to its unfired condition and ready for another cycle.

As illustrated in FIGS. 3, 5 and 5A, the nose piece 18 includes a reciprocating WCE member 128, urged downwardly by the spring 129 as shown in FIG. 5. Since FIG. 5A illustrates the tool in a fired condition, this means that the WCE 128 has engaged a workpiece or target, and has moved the WCE 128 upwardly against the bias of, and compressing, the spring 129.

Figure 3A:
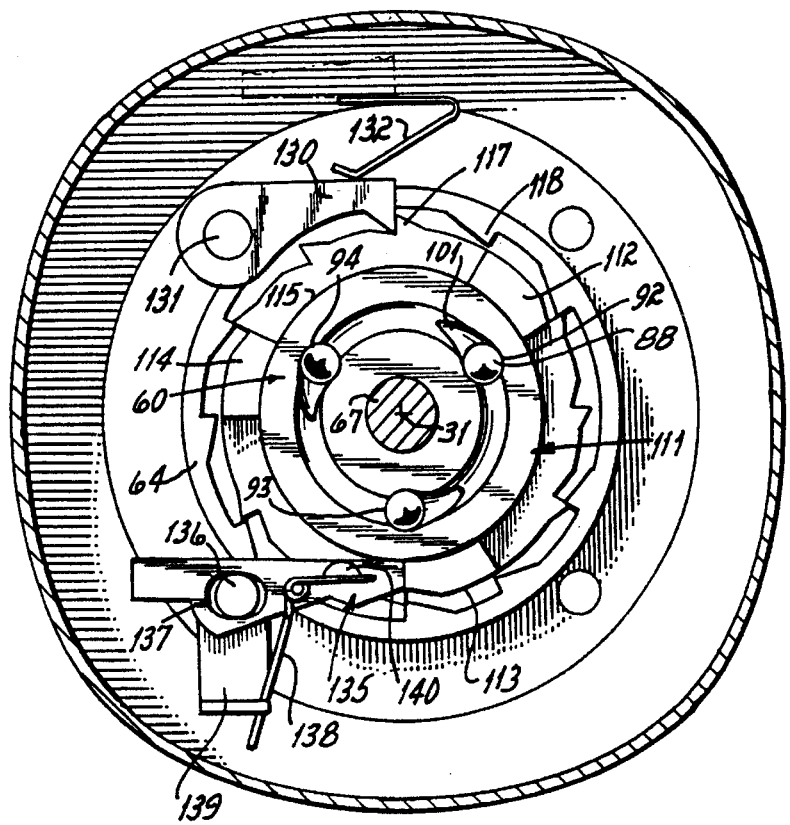
FIG. 3A is an enlarged view in cross-section of the other side of the tool of FIG. 1.

As shown in FIGS. 3 and 3A, the invention includes a hold back pawl 130, mounted on an axle 131. As perhaps best seen in FIG. 3, hold back pawl 130 meshes with the teeth 117 on the outer ball plate 60, to keep the outer ball plate 60 free of rotation in the opposite, or clockwise, direction as shown in FIG. 3. Hold back pawl 130 is urged by leaf spring 132 into engagement with the teeth 117. As shown in FIG. 3, counterclockwise rotation of the outer ball plate 60 is permitted by the pawl 130 by virtue of the inclination on the pawl itself and of the teeth 117, as shown in the figures. Another operational pawl 135 is mounted on an axle 136 by means of an elongated 137 in the pawl, which is larger than axle 136, so that the pawl can not only rotate about the axle 136, but can move radially with respect to that axle, over the extent of the elongation of the aperture 137. Pawl 135, as viewed in FIG. 3A, is biased in a counterclockwise direction by means of the spring 138. Pawl 135 is mounted on axle 136 supported by bracket 139 which is secured to tool 10.

Tool 10 utilizes a mechanically-operated trigger and associated linkage in order to actuate or cycle the tool. Portions of this linkage are seen throughout the drawings, however, reference is initially made to FIG. 3 which illustrates a trigger link or bell crank 145 pinned at 146 and biased by a spring 147 in a counterclockwise direction. As the trigger 35 is moved from its phantom line position as shown in FIG. 3, to its solid line position, forward end 35A of a trigger 35 engages the bell crank 145 to rotate it in a clockwise direction. The linkage further includes a first link 148 and a second link 149. Link 148 is pivoted at 150 to the tube 41. The other end of first link 148 includes a slot 151, receiving a pin 152, mounted on bell crank 145. The second link 149 is pivoted at 153 to the first link. A pivot 157 is located on the end of link 149 and carries thereon an actuating pawl 156 which is pivoted at 157 to the link 149. A spring 158 generally biases the actuating pawl 156 in a counterclockwise direction, as viewed in FIG. 3, about pivot 157.

A WCE link 161 is also mounted on the tube 41 for controlling the dog pawl 135. WCE link 1 61 has a sloped surface 162 for cooperative engagement with pin 163. When WCE link 161 is raised, the slope surface 162 engages pin 163 and pivots the WCE link 161 to the right, as viewed in FIG. 3, and away from the tail end 166 of dog pawl 135. When the link 161 is moved, the spring 138 which engages the projection 140 from the dog pawl 135, is operable to shift and rotate the pawl 135 counterclockwise as viewed in FIG. 3A, for engagement with one of the dogs 112, 113 or 114.

It will be appreciated that the tool of the preferred embodiment is useful in driving framing fasteners, at least 2" up to about 4" in length, fully into wood. It is believed that a typical 3½ "long framing fastener, such as a nail, requires drive exertion of about 50 horsepower to relatively instantaneously drive the nail into wood such as pine or spruce. Accordingly, the flywheel 30 is of such a mass and weight distribution that rotation in the range of about 7000 to about 15,000 revolutions per minute is sufficient to drive such a fastener into such a target. In that regard, the flywheel 30 of the present invention weighs about 0.87 pounds with a movement of inertia from axis 31 of about $4.016 \times 10^{-4}$ ft.–lbs.sec.$^2$. Of course, varying flywheel configurations, weights, weight distribution and speeds can be used to satisfy a variety of applications.

It will also be appreciated that as embodied in the preferred embodiment, the flywheel speed is reduced from about a selectable range of 7000 to 15,000 revolutions per minute down to a range of about 4000 to 10,000 revolutions per minute when a 3½" fastener is driven into wood. The initially set desired speed of about 7000 to about 15,000 revolutions per minute is regained within about 500 milliseconds.

OPERATION

Turning now to FIGS. 8A through 8E, the operation of the tool is described. In this particular sequence, the tool is operated to "bottom fire". In other words, the trigger will be fully depressed but the tool will not fire until the WCE is depressed on a target at the end of the sequence.

Figure 8A:
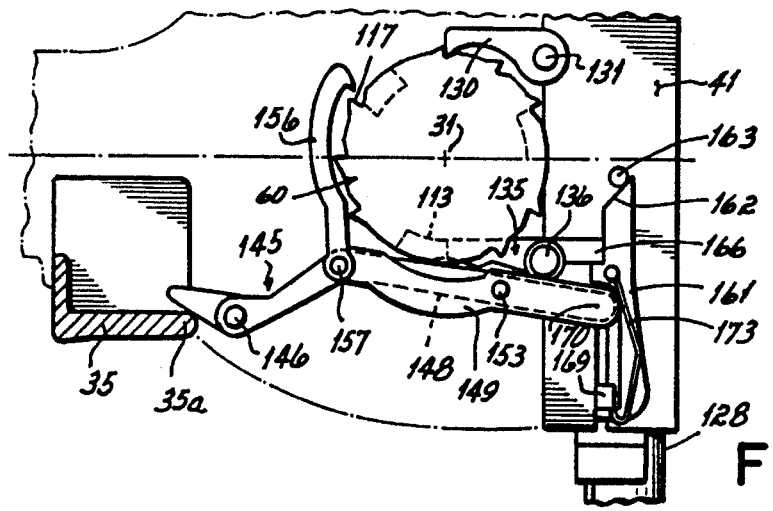
FIGS. 8A–8E are illustrations of operating sequences of the components of the tool of FIG. 1 where the trigger is first engaged and the work contacting element ("WCE") is then brought into contact with the target to cycle the tool.

In FIG. 8A, it will be appreciated that trigger 35 has not been actuated, nor has the WCE 128 been engaged against the target. Accordingly, the WCE 128 is extended, and the linkages are at rest, as generally shown in FIG. 8A. Hold back dog 130 is in a position retaining the outer ball plate 60 against motion in a clockwise direction as viewed in FIG. 8A. Actuator pawl 156 is not in a position to engage the teeth 117 of the outer ball plate 60.

Figure 8B:
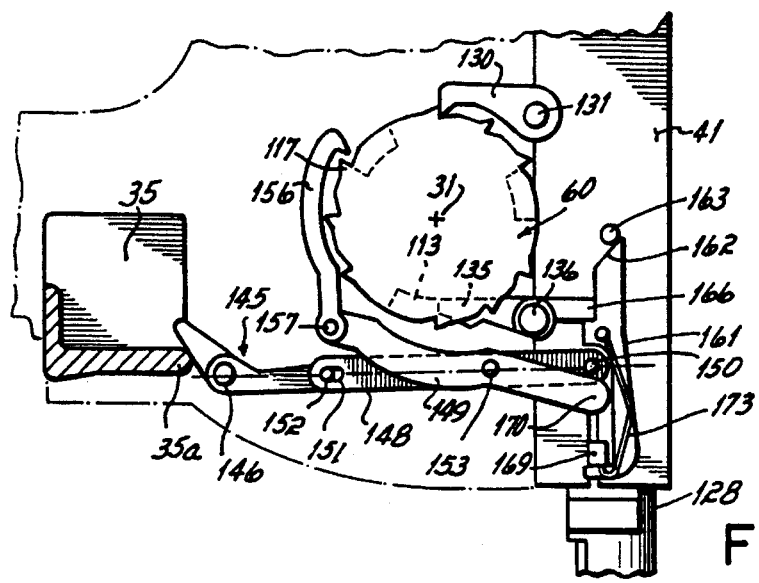

Turning to FIG. 8B, the trigger 35 has been moved to its center line or midway position, where it has now engaged the trigger bell crank 145. Trigger bell crank 145 has been rotated slightly clockwise to move pin 152 downwardly, carrying link 148 downwardly in a clockwise motion about its pivot 150. This also carries pivot 153, on which is mounted link 149 downwardly, as viewed in FIG. 8B. The WCE 128 has still not contacted a target and the WCE link 161 remains in its at-rest position as shown.

Figure 8C:
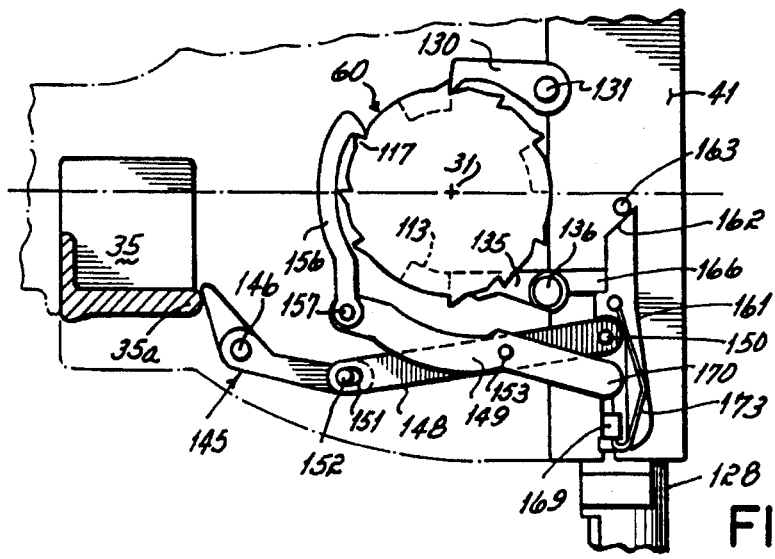

Moving now to FIG. 8C, the trigger 35 has been fully depressed, but the WCE 128 has not yet engaged a target. In this condition, the actuator pawl 156 has been moved into engagement with one of the teeth 117 on the outer ball plate 60. This motion has carried pin 152 further downwardly, as well as pivot pin 153, thus moving the actuator pawl 156 into engagement with one of the teeth 117. WCE link 161 remains at rest.

Figure 8D:
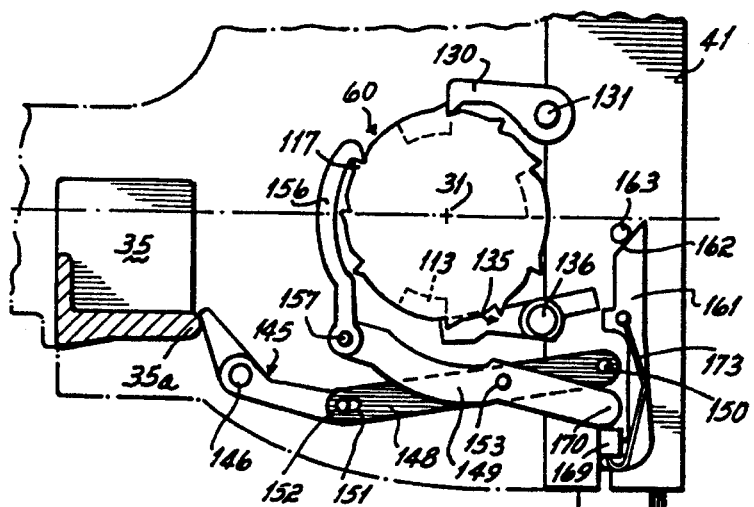

Turning now to FIG. 8D, trigger 35 remains fully engaged and the WCE 128 has engaged a target, such as wood "W", moving a projection 169 attached to WCE 128 upwardly, to engage the end 170 of link 149. This occurs by virtue of urging the tool toward a target, "w". The link 149 has not yet been moved, however.

Figure 8E:
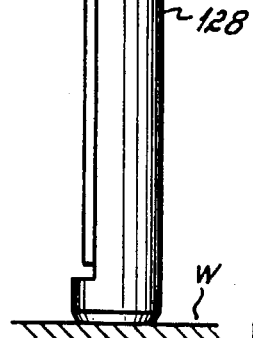

Turning now to FIG. 8E, the tool 10 has been further pressed against the wood W, depressing WCE 128 up into the tool housing, so that projection 169 has moved upwardly, engaging end 170 of link 149 and rotating that link about pivot 153. This rotation moves the pivot 157 downwardly, thereby pulling pawl 156 downwardly, and rotating the outer ball plate 60 in a counterclockwise direction as viewed in FIG. 8E, about 37 degrees. At the same time, the WCE link 161, which is also carried by structures associated with the WCE 128, has been moved upwardly and has pivoted against the action of spring 173 forwardly of the tool 10. At the same time, this upward motion lifts the tail end 166 of the dog pawl 135, to rotate it in a counterclockwise direction, as shown in FIG. BE, to clear a respective dog 112, 113 or 114 of the outer ball plate 60. In particular and referring back to FIG. 3, the dog 113 is shown in dotted lines in engagement with the dog pawl 135. The pawl is now moved, as illustrated in FIG. 8E, to clear this dog and permit rotation of the outer ball plate 60. The motion of the WCE 128 in link 161 is timed via the linkage as shown, so that the dog pawl 135 is moved to clear the ball plate 60 when the actuating pawl 156 is operated to pull the outer ball plate 60 in a counterclockwise direction. It will be appreciated that rotation of pawl 135 clears it from the dog and it now shifts linearly over the top of the dog, on which it rests, which motion is accommodated by the elongated aperture 137. In this position, it no longer can prevent rotation of plate 60.

This motion of the full trigger pull with the full engagement of the WCE 128 serves to rotate the outer ball plate 60, approximately 37 degrees in a counterclockwise direction as shown in FIGS. 8A through 8E and in the direction of the arrow 175, as illustrated in FIG. 7 and FIG. 8E.

Referring back now to FIGS. 4 and 4A, the operation of the above sequences occurs to place the actuating mechanism, cone clutch and flywheel, from the condition shown in FIG. 4, to the condition shown in FIG. 4A, which illustrates the apparatus just as the actual drive or cycling is started. In particular, the rotation of the outer ball plate 60 carries, for example, the ramp 101 counterclockwise, which urges the ball in an axial direction toward the flywheel. Since the ball is captured by the inner ball plate, the decreasing distance between the ramp 101 in the outer ball plate 60 and the pocket 89 and ramp 95 in the inner ball plate 58 causes the outer ball plate to be moved axially away from the flywheel, while the inner ball plate 58 is biased inwardly against the spring 79, toward the flywheel. As the outer ball plate 60 rotates further and the ball forces the two ball plates 58 and 60 further apart, the springs 63 are compressed, and finally, the cone clutch 55 is driven into contact with the flywheel 30. The spinning flywheel immediately grabs the cone clutch 55 and imparts to it a pulse of rotational energy in a clockwise direction, as viewed in FIGS. 8A–8E. This rotates both the inner ball plate 58 and the drum 57 very quickly in a clockwise direction, to roll up the cable 45 on the surface 82 of the drum. When the cable is quickly rolled up, it is tensioned and it pulls the driver 40 downwardly, with enough energy and force to drive a nail into a single or multiple pieces of wood "W" (FIG. 5A). It will be appreciated that the cable 52 is wrapped up on the surface 82 of the drum 57 as this rotation takes place.

Just before the drum approaches its fully driven position, as illustrated in FIG. 5A, the inner ball plate 58 rotates a sufficient distance, and approximately 203 degrees about axis 31, so that its pockets 89, 90, 91 line up with respective pockets in the outer ball plate 60. With the balls in the pockets, the inner ball plate is now free to move axially along axis 31, as driven by spring 79 away from the flywheel 30. When the balls fall into these pockets, the belleville springs 63 also expand. By the action of spring 79, the cone clutch 55 is moved axially away from the flywheel 30, disconnecting the flywheel and the energy it represents, from the cone clutch 55 and the drum 57. Therefore, over the period of time of engagement of the cone clutch with the flywheel, a pulse of energy is transferred from the flywheel through the cone clutch and the drum, the driver and thence to the nail. Just after the drum 57 is disconnected from the flywheel, the projection 120 extending from the drum engages a resilient member 123 of the drum stop 56 to stop the drum in its clockwise motion as viewed in FIG. 5A, for example.

At the same time as this occurring, the drum is rotating through the same angular extent as the rotation of the inner ball plate 58 and circumferential surface 86. Since an enlarged end of the return cable 52 is engaged in a slot, machined into the surface 86, cable 52 is wound onto the surface 86 at the same time as drive cable 45 is wound onto the drum 57. This compresses or loads the spring 50, since the cable 52 pulls the endcap 51 longitudinally with respect to the distal end of the spring. Of course, the spring and cable connection could be arranged so the spring is stretched or loaded on wind-up of the drum, or other suitable springs in varying configurations may be used with the reduced spring travel required.

Once the engagement between the flywheel 30 and cone clutch 55 is broken off, the spring 50 is operable to bias the drum, now in a counterclockwise position, as shown, for example in FIG. 5A, back to the position shown in FIG. 5. This counterclockwise motion extends and unwinds the cable 45 and it pushes the driver 40 upwardly back toward its unfired condition, all of which may occur, for example, while the trigger still remains depressed and the WCE retracted into the tool 10, as shown in FIG. 5A. Accordingly, it will be appreciated that the inner ball plate 58 and the outer ball plate 60 have moved approximately 240 degrees with respect to each other. This action is like that described in applicant's parent application, incorporated herein by reference. It will be, of course, appreciated that the movement of the pockets and ramps in the respective ball plates, and the respective balls are generally similar, providing a balanced actuation.

FIGS. 9A–9C illustrate a firing of the tool by first fully engaging the WCE and then subsequently pulling the trigger. For example, in FIG. 9A, the WCE 128 has been engaged against a wood surface "W", for example. This has lifted the projection 169 upwardly, engaging end 170 of link 149 and raising it upwardly. Since, however, the trigger 35 is disengaged, the trigger bell crank 145 has not been rotated, and the link 148 (hidden from view in FIG. 9A) has not been lowered. This leaves link 149 in an upward position, such that actuator pawl 156 has not engaged any tooth 117 on outer ball plate 60. Note, however, that the WCE link 161 has been lifted and pivoted, thereby lifting the end 166 of dog pawl 135 so that the pawl has been rotated in a counterclockwise direction as viewed in FIG. 9A. As mentioned above, the aperture 137 in the dog pawl 135 is elongated. When the spring 138 biases the dog pawl 135, it moves or shifts the pawl slightly to the left, as viewed in FIG. 9A (i.e. to the right as viewed in FIG. 3A), so that the forward end of the dog pawl 135 moves over the associated dog on the outer ball plate 60. Thereafter, the dog pawl 135 lies on top of any dog thereunder on outer ball plate 60 and is ineffective to prevent the counterclockwise rotation of the inner ball plate 60 when the trigger is subsequently pulled.

In FIG. 9B, the WCE 128 remains fully engaged on a wood surface "W" and the trigger 35 has been moved to its halfway or centerline position, which has partially rotated the trigger bell crank 145, so as to rotate link 148 about its pivot 150, and thereby to lower link 149 slightly, causing the actuator pawl 156 to engage in a tooth 117 of the outer ball plate 60. As shown in FIG. 9C, continued motion of the trigger 35 in an upward direction further rotates the trigger bell crank 145, further rotating link 148 about pivot 150 and further lowering the pivot 153 and link 149, which carries the actuating pawl 156 downwardly. This operation causes a counterclockwise rotation (arrow 175) of the outer ball plate 60, as noted above, for the purpose of cycling the tool as described above.

Accordingly, the tool 10 can be cycled or fired by first depressing the trigger and then depressing the WCE against the target, or by first depressing the WCE against the target and then depressing the trigger. By holding the trigger down, the tool can be repeatedly pressed against a surface with the depression of the WCE actuating or cycling the tool.

Moreover, while the preferred embodiment of the invention has been described in conjunction with a fastener driving tool, the apparatus includes a drive or power unit which can be adapted to drive many tools, whether handheld or not, or for imparting a pulse of energy to a movable or driveable working member for a variety of different purposes.

The present invention has the advantage of delivering of energy to the wind up drum 57 quickly. The clutch very quickly engages the flywheel to drive the drum and just as quickly disengages from the flywheel to move the energy input from the drum, resulting in an approximate 203 degree rotation of the drum, which is operable by means of the cable, to move the movable member or fastener driver 40. Utilization of such apparatus provides a relatively light-weight handheld tool yet capable of generating enough power and force to drive fasteners capable of being used in framing applications, for example 3 to 4 inch nails into wood, such as 2×4s, using typical residential housing framing.

Another advantage is realized in that the location of the motor at the rear end 14 of the handle 12 helps to balance out the tool, so as to make the tool easy to hold and to use, and thus less tiring to the user.

The use of spiral bevelled gears has been found to be particularly advantageous in transferring the energy from the motor to the flywheel, without such an undue loss of power or speed, as to require an undesirably larger motor.

MOTOR CONTROL

Figure 10:
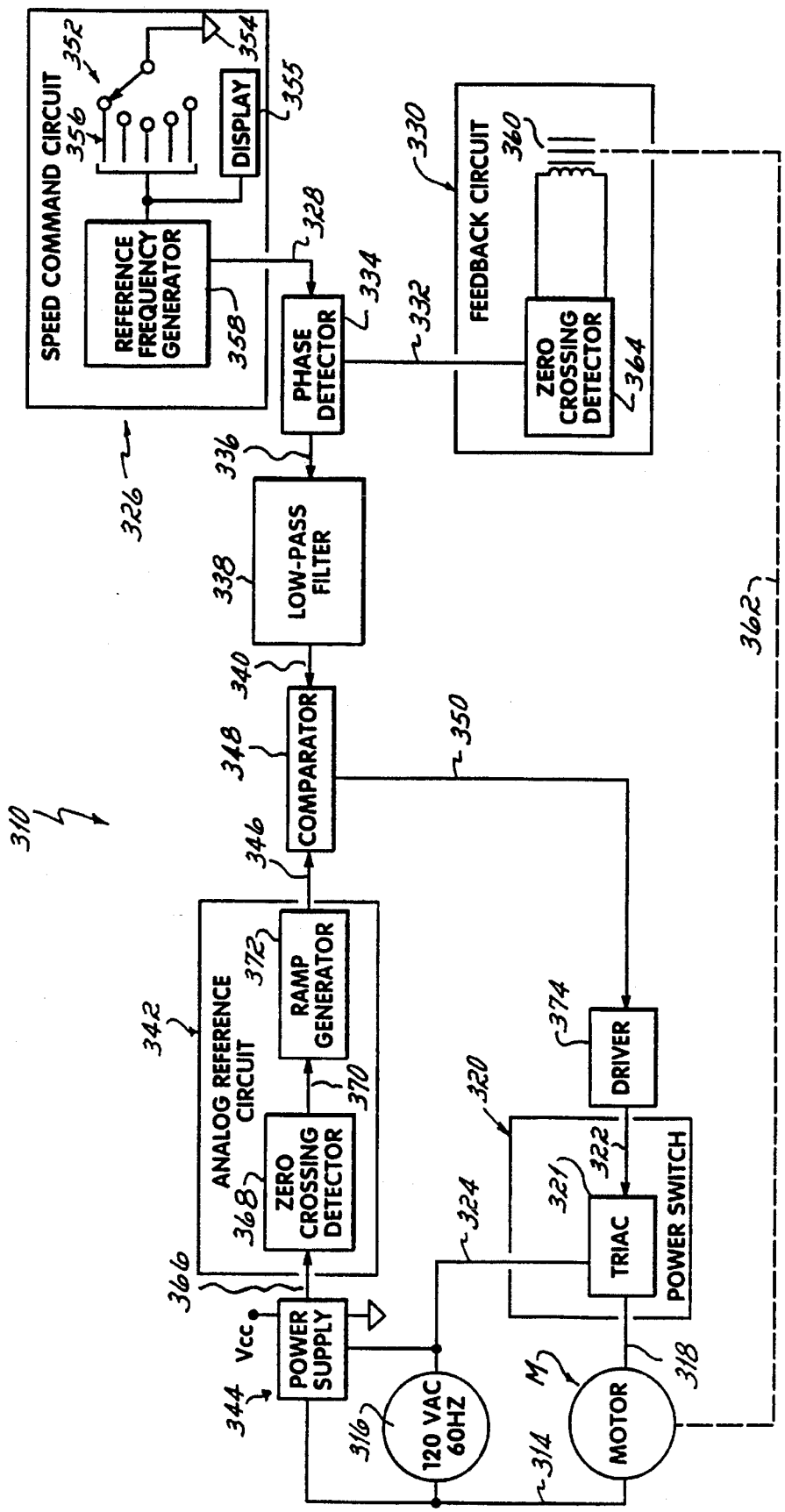
FIG. 10 is a schematic block diagram of the motor control of the present invention.

FIG. 10 is a schematic block diagram illustrating the motor control 310 which is used to regulate the speed of a universal AC/DC motor M. One lead 314 from the motor is connected to a 120 VAC 60 Hz source of power 316. The other lead 318 from the motor M is connected to a power switch 320 which is also connected to the source of AC power 31 6 by lead 324. The power switch 320 includes a triac 321 which has a trigger input 322 to control the operation of the triac 321. The power switch 320 controls the application of the AC signal on lead 324 to the motor M by using a trigger pulse on the trigger input 322 to control the phase angle at which the triac 321 is switched into conduction.

The motor control 310 of FIG. 10 has a speed command circuit 326 for generating a speed command signal on output 328 having a reference frequency representing a desired speed of the motor M. A feedback circuit 330 is responsive to the rotation of the motor and generates a feedback signal on output 332 which has a frequency proportional to the actual speed of the motor M. A phase detector 334 is responsive to the speed command and feedback signals and produces an error signal on an output 336 as a function of the phase difference between the speed command and feedback signals. A low pass filter 338 is connected to the phase detector 334 and produces an averaged error signal on an output 340 as a function of the error signal on output 336. An analog reference circuit 342 is connected to a power supply 344 and produces an analog reference signal on an output 346. A comparator 348 is responsive to the averaged error signal and the analog reference signal and produces trigger pulses on an output 350 as a function of the analog reference and averaged error signals. The trigger pulses command the phase angle switching of triac 321 which controls the application of the AC signal on line 324 to the universal AC/DC motor M such that the phase of the feedback signal on output 332 is locked with the phase of the speed command signal on line 328.

The speed command circuit 326 has a selector switch 352 connected to a voltage source 354. The selector switch 352 has a number of selectable input states that correspond to the selectable desired motor speeds. A desired motor speed is a function of the desired force to be generated by the power tool. With the present example of a power fastener, for example, a power nailer, the selector switch 352 is calibrated in terms of either nail size or the depth to which a nail is to be driven in a selected target, Power settings can be generically indexed for reference to a table indicating the proper setting for given fastener length, depth and target. The selector switch 352 has a plurality of outputs 356 equal to the number of selectable states of the switch 352. A reference frequency generator 358 is connected to the selector switch 352 and provides a speed command signal on output line 328 having a reference frequency representing the desired motor speed as determined by the selection effected with the selector switch 352, For example, in response to ten selectable input states from the selector switch 352, the reference frequency generator 358 provides ten respective reference frequencies that range for example, from 4 KHz to 8 KHz. A display 355 is also responsive to the selector switch 352 to provide a visual indication to the operator of the selected input value.

The feedback circuit 330 includes a feedback transducer 360 which as indicated by dashed line 362 is responsive to the rotation of the motor M. The feedback transducer 360 is any device responsive to the rotation of the motor that provides an output signal changing as a function of the actual speed of the motor M. A zero crossing detector 364 is connected to the feedback transducer 360 and provides a feedback signal on line 332 having a feedback frequency proportional to the angular velocity of the motor M.

The power supply 344 which is connected to the source of AC power 316 provides DC power levels on an output 366 which are used to power other devices within the motor control 310. The analog reference circuit 342 includes a zero crossing detector 368 which is responsive to the zero crossings of the AC signal from the source of AC power 316 and provides a zero crossing sync signal on output 370. The analog reference circuit 342 also includes a ramp generator 372 which initiates the analog reference signal on output 346. The analog reference signal is a series of ramp signals, each of which is initiated in response to a zero crossing of the AC signal. Subsequent zero crossings of the AC signal terminate the current ramp signal and initiate a successive ramp signal. Therefore, with an AC signal of 60 Hz, the ramp signals are produced at a frequency of 120 Hz. The ramp signal is a time varying analog reference signal that starts at a minimum magnitude value and increases in magnitude linearly with time until the ramp signal is terminated. The comparator 348 is responsive to the ramp signal and the averaged error signal from the low pass filter 338, and produces a trigger pulse signal on output 350 in response to the magnitude of the averaged error signal exceeding the magnitude of the ramp signal.

The power switch 320 is connected to driver 374 which conditions the trigger pulse on line 350 for the input 322 of the triac 321. Consequently, the trigger pulse on line 350 causes the triac 321 to switch into conduction, or ON, at a phase angle of the AC signal that is determined by the point of interception of the ramp signal on line 346 with the averaged error on line 340. AC power is applied to the motor in accordance with the firing phase angle of the triac; and when the AC signal from the source of AC power 316 passes through the next zero crossing, the triac 321 turns OFF. The net effect is to lock the phase of the feedback signal on line 332 with the phase of the speed command signal on line 328 which results in the actual speed of the motor M being equal to the desired speed as selected by the switch 352. By using phase as the controlling variable, the motor is very accurately regulated about its desired speed.

Figure 11:
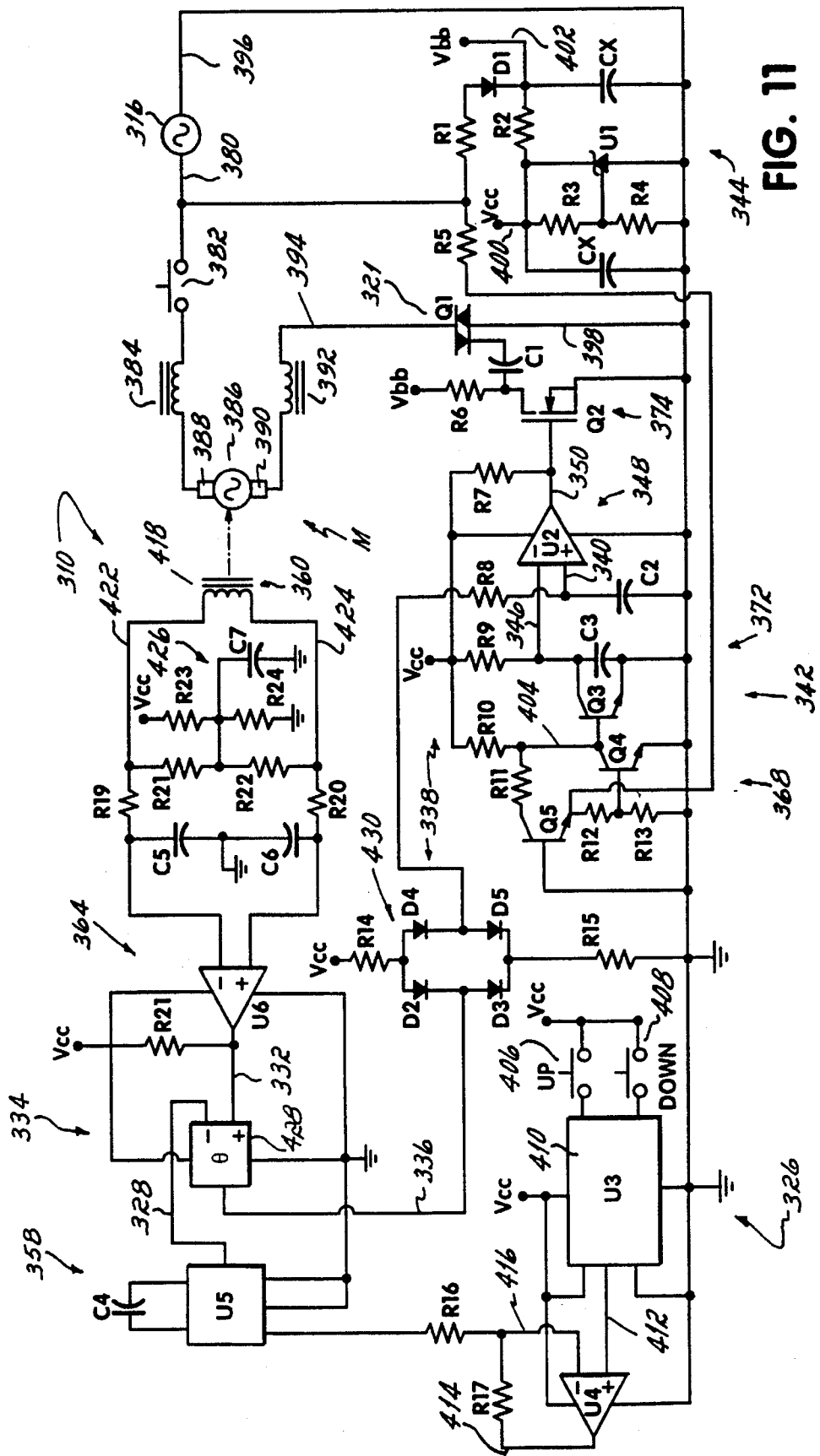
FIG. 11 is a circuit diagram illustrating components of the motor control of FIG. 10 in more detail.

FIG. 11 is a detailed schematic diagram illustrating the discrete components used in the motor control 310 to regulate the speed of the motor M, for example, a series universal AC/DC brush type motor of approximately 0.625 horsepower. One lead 380 from the AC power source 316 is connected to a manually operated ON/OFF switch 382 which is in a circuit supplying current to one set of motor field coil windings 384, a motor armature 386 via brushes 388 and 390, a second set of motor field coil windings 392 and an output 394 of triac 321. The common line 396 of the AC power source 316 is connected to the power input 398 of the triac 321, for example, part no. MAC15-6 commercially available from Motorola of Schaumburg, Ill.

The power supply 344 is connected to the source and common lines 380, 396, respectively, of the power supply 316 to provide a 5 volt DC supply voltage on output 400 and a 12 volt DC supply voltage on output 402. The supply voltages are provided from a half wave rectified AC signal produced by the diode D1 and power resistor R1. The DC supply voltages on outputs 400 and 402 must be sufficiently stable and noise free so that they can function as a power supply for integrated circuits and devices used elsewhere in the motor control 310.

The source and common lines 380, 396, respectively, of the power source 316 are also connected to the zero crossing detector 368 which is made up of transistors Q4, Q5, for example, part no. 2N3904 commercially available from Motorola, and resistors R10, R11, R12, R13. As the AC signal passes through a negative to positive zero crossing, current flow through resistors R12, R13 goes towards zero; and transistor Q4 will switch OFF. Therefore, the voltage level at the collector 404 of transistor Q4 will switch to approximately the supply voltage $V_{cc}$ of +5 volts DC ("VDC"). As the AC signal rises in a positive direction, the current flow through resistors R12, R13 will quickly bias transistor Q4 ON, thereby switching the collector 404 of the transistor Q4 back to approximately ground. Therefore, a first zero crossing pulse of a short duration is produced at the collector 404 of transistor Q4 with each negative to positive zero crossing.

At a subsequent positive to negative zero crossing of the AC power signal, as the AC power signal passes through the zero crossing, transistor Q4 will again be switched OFF; and the collector 404 will rise to approximately +5 VDC. As the AC voltage signal moves negative, transistor Q5 is switched ON; and the current path through resistors R10, R11, R12, R13 quickly biases transistor Q4 OFF, thereby switching the collector 404 of transistor Q4 back to approximately ground. Hence, a second zero crossing pulse of a short duration is produced at the collector 404 of transistor Q4 with each positive to negative zero crossing of the AC power signal.

The zero crossing detector 368 within the analog reference circuit 342 drives a ramp generator 372 including transistor Q3, capacitor C3 and resistor R9. With each positive going, that is, rising, edge of each zero crossing pulse corresponding to each zero crossing, transistor Q3 is switched ON thereby providing a discharge path for capacitor C3 through transistor Q3. With each trailing, that is, negative going edge of each zero crossing pulse the transistor Q3 is switched OFF; and capacitor C3 slowly charges from current flowing through resistor R9. The gradual charging of capacitor C3 provides a voltage level which increases approximately linearly with time, thereby approximating a ramp signal. The ramp signal is terminated and dropped back to its initial level of approximately zero VDC with the leading edge of the next zero crossing pulse. Therefore, for a 60 Hz AC power signal, the zero crossing pulses will be produced at a frequency of 120 Hz. The train of zero crossing pulses will initiate a series of ramp signals at a frequency of 120 Hz. The ramp signals are analog reference signals which are in sync with the zero crossings of the AC power signal and during each half wave of the AC power signal, the ramp signals have a voltage level which is unique and different for each point in time during the half-wave excursion of the AC power signal.

Within the speed command of circuit 326, the speed selector switch 352 is implemented with a speed up push button 406 and a speed down push button 408 providing inputs to a digital potentiometer 410, for example, part no. DS1669 commercially available from Dallas Semiconductor of Dallas, Tex. The digital potentiometer 410 has an output 412 connected to an operational amplifier U4, for example, part no. TLC272 commercially available from Texas Instruments. The output 412 of digital potentiometer 410 has 64 discrete states in response to speed up or speed down input commands provided by actuating the push buttons 406, 408, respectively. The operational amplifier U4 is connected to a reference frequency generator 358 having a voltage controlled oscillator U5, for example, part no. MC54/74HC4046A commercially available from Motorola. The operational amplifier U4 operates as a bias generator for the voltage controlled oscillator U5. The output 414 of operational amplifier U4 is connected to its input 416 through resistor R17. In order for the operational amplifier U4 to maintain its balanced state in response to changes in the voltage level in the output 412, the input 416 to operational amplifier U4 sinks current from the voltage controlled oscillator U5, thereby providing a voltage drop across resistor R16 as a function of the output signal on output 412 digital potentiometer 410. The voltage controlled oscillator U5 produces a reference frequency on output 328 which is unique to the speed command established by the push buttons 406, 408. The desired power produced from the tool is a function of the kinetic energy stored in the rotating flywheel. The kinetic energy is equal to $\frac{1}{2}(I)(\omega^2)$; where $I$ is the moment of inertia of the flywheel and $\omega$ is the angular speed of the flywheel. Therefore, the reference frequency is calibrated to represent a desired motor speed that will provide the flywheel with the kinetic energy to apply a force corresponding to a desired input switch setting.

A proximity sensor 418, for example, part no. MP25TA00 commercially available from Red Lion Controls of York, Pa., functioning as a feedback transducer 360 is magnetically coupled to the motor M to sense the speed in revolutions per unit time of an output shaft of the motor M. The proximity sensor 418 provides sinusoidal outputs on lines 422, 424 which are 180 degrees out of phase and have a frequency proportional to the angular speed, or revolutions per minute, of the rotating armature 386. The feedback signal from sensor 418 passes through a DC biasing network 426 including resistors R23, R24 and capacitor C7 the output of which is connected to the inputs of a zero crossing detector 364 implemented with an voltage comparator U6, for example, part no. TLC372 commercially available from Texas Instruments. The filtered feedback signal is connected to the inputs of the voltage comparator U6 to provide common mode noise rejection. Therefore, the zero crossing detector 364 provides a relatively stable and noise free feedback signal on line 332 that has a frequency which is directly proportional to the actual speed of the motor.

The phase detector 334 includes a tri-state phase comparator 428, for example, part no. MC54/74HC4046A commercially available from Motorola, which is responsive to the speed command and feedback frequencies to produce on output lead 332 an error signal having a duty cycle as a function of the difference in phase between the speed command reference and feedback frequencies. The low pass filter 338 includes a diode switching network 430, resistors R8, R14, R15 and capacitor C2. The low pass filter is responsive to the error signal on output 336 of phase detector 334 and provides a DC voltage level on output 340 having a magnitude proportional to the duty cycle of the error signal. The comparator 348 includes a voltage comparator U2, identical to comparator U6, which is responsive to the ramp signal on the output 346 of the ramp generator 372 and the average error signal on output 340 of low pass filter 338 to produce a trigger pulse on output 350 to switch the triac 321 ON in response to the averaged error signal intersecting the ramp signal.

When the reference and feedback frequencies are in phase, the tri-state phase comparator 428 has a quiescent tri-state output. When the actual motor speed is less than the desired motor speed, the phase of the reference frequency is leading the phase of the feedback frequency; and the phase comparator 428 produces a negative going signal in response to the rising edge of the leading reference frequency. The phase comparator 428 returns the negative going signal to the quiescent tri-state output in response to the next rising edge of the lagging feedback frequency. Similarly, when the actual motor speed is greater than the desired speed, the phase of the feedback frequency is leading the phase of the reference frequency; and the phase comparator 428 produces a positive going signal in response to a rising edge of the feedback frequency. The phase comparator 428 switches the negative going signal back to the quiescent tri-state output in response to the next leading edge of the lagging reference frequency. Therefore, the tri-state phase comparator 428 produces a series of either negative-going pulse-like signals or positive-going pulse-like signals in response to the phase of the feedback frequency either lagging or leading, respectively, the phase of the speed command reference frequency. The duration of the pulse-like signals is proportional to the magnitude of the phase shift or phase difference between the feedback and reference frequencies.

Assume, for example, that the motor M is running at a speed equal to the desired speed represented by the speed command signal. In that situation, the phase of the feedback frequency has a constant relationship with respect to the phase of the reference frequency. The phase comparator 428 is switched to its quiescent tri-state output, and the switching diode network 430 is in a quiescent state in which the diodes are not solidly switched ON or OFF. However, the charge on the capacitor C2 provides a voltage magnitude on an input of voltage comparator U2 which intersects the ramp signal on the other comparator input to provide a trigger pulse on output 350, The trigger pulse switches the triac 321 ON during each half phase of the AC power signal to supply sufficient current to the motor M to maintain the desired speed. Depending on the charge on the capacitor C2, the capacitor C2 may at this time have a leakage path through resistors R8, R15 and diode D5.

Assume, for example, that the motor M slows down which results in the phase of the speed command reference frequency leading the feedback frequency. Therefore, in response to a rising edge of the reference frequency, the tri-state phase comparator 428 produces negative going output signal on output lead 336. That output signal switches diode D2 ON thereby sinking current through resistor R14, which switches diodes D3, D4 OFF and diode D5 ON. That state of the diode bridge 430 provides a discharge path for capacitor C2 through resistors R8 and R 15. Capacitor C2 discharges relatively quickly thereby reducing the voltage magnitude on the output 340 which is an input of voltage comparator U2.

Therefore, when the actual motor speed slows down below the desired motor speed the tri-state phase comparator 428 produces an error signal having a series of pulse-like negative going signals which reduce the magnitude of the averaged error signal being produced by the low pass filter 338. The reduced magnitude of the averaged error signal intersects the ramp signal at an earlier point in time of the half wave duration of the AC power signal. Therefore, the voltage comparator U2 produces a trigger pulse to the triac at an earlier point in time. The triac 321 switches more current to the motor thereby increasing the actual motor speed toward the desired motor speed. The next rising or positive going edge of the feedback frequency will return the tri-state phase comparator to its tri-state quiescent output. The process repeats itself for the successive positive going edges of the reference and feedback frequencies in which the reference frequency is leading the feedback frequency.

In the other situation, where the motor is running faster than the desired speed command, the feedback frequency will lead the reference frequency in phase. Therefore, in response to a rising or positive going edge of the feedback frequency, the output 336 of the tri-state phase comparator is switched to a positive going signal which switches diodes D2, D5 OFF and switches diodes D3, D4 ON. Capacitor C2 is then able to source current through resistor R14 thereby increasing the voltage magnitude of the signal on the output lead 340 from the low pass filter 338. In response to the next rising edge of the reference frequency, the tri-state phase comparator returns its output 336 to the tri-state quiescent output signal level, thereby returning the diode bridge to is quiescent state and terminating the charging of capacitor C2 through resistor R14. The above process is repeated with respect to every successive rising edge of the feedback frequency which is leading the rising edge of the reference frequency. Therefore, when the actual motor speed exceeds the desired motor speed, the tri-state phase comparator 428 produces a series of positive going pulse-like signals, each of which allows the capacitor C2 to build charge, thereby increasing the voltage magnitude of the averaged error signal from the low pass filter 338. As the magnitude of the averaged error signal level increases, the point at which it intersects the voltage magnitude of the ramp signal occurs at a later time during the generation of the ramp signal. Consequently, the voltage comparator U2 will produce a trigger pulse at a later point in time with respect to the ramp signal. That trigger pulse will cause MOSFET Q2 within driver 374, for example, part no. 2N7000 commercially available from Motorola, and triac 321 to switch ON at a later point in time in the half cycle duration of the AC signal, thereby reducing the current flow to the motor and in turn, the motor speed.

The component values for the resistors R14 and R15 of the low pass filter 338 are chosen Such that when the motor slows down, the discharge path for the capacitor C2 permits the capacitor to discharge relatively rapidly, thereby quickly moving the switching point of the triac 321 to quickly increase the current being supplied to the motor. In contrast, when the motor speed is greater than the desired speed, systematic physical forces, such as friction and other losses, effect a natural slowing of the motor. Therefore, the system component values are chosen to more slowly charge capacitor C2 in the situation where the motor speed is too fast; and the systematic forces are also helping to reduce the speed of the motor. The low pass filter can also be considered a digital to analog converter. The filter responds to a digital signal from the phase comparator 428 having a duty cycle representing the phase error between the reference and feedback frequencies, and the filter produces a DC voltage output representing the average of that phase error.

In use, the operator uses switch 382 to apply power to the motor M; and the switches 406, 408 are used to set an input command representing the desired output of the power fastener. If a visual or other indicator is used to represent the input command of the operator, it may be calibrated in units representing motor speed, the applied force of the tool, the size of the fastener being driven by the tool, etc. If, for example, the power fastener is being used as a nail driver, to drive nails in the range of from 2.0 inches to 3.5 inches, the motor speed may be selectable in a range of from 7,000 rpm to 15,000 rpm. In the absence of a visual indicator, the desired force may be established by driving several trial fasteners. Once the desired input has been set, that setting will be maintained even if the tool is turned off and restarted. Upon execution of a driving tool cycle to drive a fastener, a pulse of kinetic energy is expended; and the speed of the flywheel 30 and the motor M is reduced. The phase detector 334 produces large error signals which are negative going signals having a longer duration thereby causing triac 321 to provide the maximum current to the motor M. The capacitor C2 discharges rapidly, and the switching point of the triac 321 rapidly moves to increase the current being supplied to the motor. The motor control 310 is able to accelerate the motor to bring the motor and flywheel back to the maximum selectable speed in approximately 500 milliseconds. As the speed of the motor increases such that the difference between the desired speed and the actual motor speed is reduced, the triac 321 changes switching points so that the average current applied to the motor M is also reduced. As the desired and actual motor speeds become equal, the reference and feedback frequencies will lock into a relationship in which the phase of the reference frequency slightly lags the phase of the feedback frequency. The motor control 310 is sensitive to phase differences between the reference and feedback frequencies that are less than the periods of the reference or feedback frequencies. Therefore, by being able to control the speed of the motor within the time domain of a phase difference, the motor control 310 can regulate the speed of the motor to within approximately ±1% of the selected motor speed.

While the invention has been set forth by the description of the embodiments in considerable detail, it is not intended to restrict or in any way limit the claims to such detail. Additional advantages and modifications will readily appear to those who are skilled in the art. For example, the invention provides a unique, electrically driven fastener driving tool capable of driving framing nails and staples at desired cycle frequencies. The tool effectively uses a single flywheel and a motor control for a simple motor providing desired flywheel speed and speed recapture despite remote motor mounting in the handle and the use of a drive shaft to impart rotation to the flywheel. The tool is balanced by virtue of the handle end mounted motor. Improved trigger linkage facilitates normal actuation of the tool. The invention also provides a drive or power unit useful with a variety of tools, implements and devices for having a driven working member.

In addition, the power supply 344 may be created from either a half wave rectified or full wave rectified AC signal. In either event, the zero crossing detector 368 is responsive to all zero crossings and provides zero crossing pulses having a frequency of 120 Hz. The selector switch 352 within the speed command circuit 326 may be implemented in several ways. The switch 352 may be a single switch with four outputs that can be decoded into 10 selections. The four switch outputs may be connected to a BCD-to-decimal converter which provides ten voltage levels to a voltage controlled oscillator. The feedback transducer 360 may be any device which is responsive to the rotation of the motor M and provides a periodic output signal having a frequency proportional to the motor speed. The comparator 348 and low pass filter 338 may be implemented with other devices which provide a trigger pulse to the power switch 320 having a leading edge with respect to the ramp signal which is a function of the difference in phase between the speed command signal and the feedback signal.

The motor control of the present invention is described with reference to controlling the speed of a universal AC/DC motor used to drive a flywheel in a hand tool. While the motor control of the present invention has certain characteristics that are advantageous in that application, the characteristics of the motor control described herein may be advantageously used in many other applications. The motor control described herein may be used to control the speed of any universal AC/DC motor in many applications.

The invention, in its broadest aspects, is therefore not limited to the specific details shown and described. Accordingly, departures may be made from such details without departing from the spirit and scope of the invention and applicant intends to be bound only by the claims appended hereto:

What is claimed is:

1. A speed control for a motor control connected to a universal AC/DC motor powered by an AC signal from a source of AC power, the motor control including a triac power switch and an analog reference circuit, the triac power switch being connected between the source of AC power and the motor and including a trigger input for controlling the application of the AC signal to the motor; and the analog reference circuit being responsive to the AC signal for iteratively providing ramp signals, each ramp signal restarting approximately with each zero crossing of the AC signal, the speed control comprising:

an input switch circuit providing an input signal having a voltage amplitude representing a desired motor speed;

a voltage controlled oscillator connected to the input switch circuit and producing a speed command signal having a reference frequency as a function of the voltage amplitude of the input signal;

a feedback transducer responsive to rotation of the motor for producing a feedback signal having a feedback frequency representing an actual speed of the motor;

a phase detector responsive to the speed command signal and the feedback signal for producing a phase error signal representing a difference in phase between the reference and feedback frequencies;

a diode bridge circuit for generating a DC voltage level responsive to the phase error signal;

a low pass filter responsive to the DC voltage level from the diode bridge circuit for producing an averaged phase error signal;

and a comparator connected to the analog reference circuit and the low pass filter for producing a trigger pulse in response to each ramp signal, each trigger pulse having a leading edge with respect to a respective ramp signal as a function of the averaged phase error signal, whereby the AC signal is applied to the motor as a function of the phase error signal, thereby maintaining a zero frequency difference between the reference and feedback frequencies and causing the actual motor speed to be approximately equal to the desired motor speed.

2. A speed control connected to a universal AC/DC motor powered by an AC signal from a source of AC power, the speed control having a triac power switch connected between the source of AC power and the motor, and the triac power switch including a trigger input for controlling the application of the AC signal to the motor; and the speed control being responsive to the AC signal to iteratively initiate ramp signals synchronized with zero crossings of the AC signal, each ramp signal having a duration approximately equal to the duration between the zero crossings of the AC signal, the speed control further comprising:

a speed command circuit to selectively provide one of a plurality of speed command signals having a reference frequency representing one of a plurality of selectable desired speeds of the motor;

a feedback circuit responsive to rotation of the motor and producing a feedback signal having a feedback frequency representing an actual speed of the motor;

a phase detector responsive to the one of the plurality of speed command signals and the feedback signal for producing a phase error signal having a duty cycle proportional to a difference in phase between the reference and feedback frequencies;

a diode switching and low pass filter circuit connected to the output of the phase detector for generating a DC signal responsive to the phase error signal representative of an average phase error signal;

and a comparator circuit connected to the trigger input of the triac power switch and responsive to the ramp signals and the signal representative of the average phase error signal for producing trigger pulses, the trigger pulses being initiated as a function of a phase difference between the reference frequency and the feedback frequency, whereby switching the triac power switch with the trigger pulses applies the AC signal to the motor as a function of the frequency difference thereby causing the actual motor speed to be approximately equal to the desired motor speed.

3. The speed control of claim 2 wherein the speed command circuit includes:

an input switch circuit providing an input signal having a voltage amplitude representing the one of the plurality of selectable desired speeds of the motor; and a voltage controlled oscillator responsive to the input signal and producing the one of the plurality of speed command signals having the reference frequency.

4. The speed control of claim 2 wherein the phase detector is a tri-state phase comparator producing a series of pulses including positive pulses representing a first phase difference between the speed command signal and the feedback signal and negative pulses representing a second phase difference between the speed command signal and the feedback signal.

5. The speed control of claim 4 wherein the first phase difference is produced in response to the feedback signal lagging the speed command signal and the second phase difference is produced in response to the feedback signal leading the speed command signal.

6. The speed control of claim 2 wherein the diode switching and low pass filter circuit further functions as a digital-to-analog converter.

7. The speed control of claim 2 wherein each trigger pulse has a pulse width determined as a function of the phase error signal.

8. The speed control of claim 2 wherein the speed command circuit selectively provides one of a plurality of speed command signals representing a desired speed of the motor in a range of from approximately 7,000 revolutions per minute to approximately 15,000 revolutions per minute.

9. The speed control of claim 2 wherein the comparator circuit produces trigger pulses to the triac to cause the actual motor speed to be approximately equal to the desired motor speed within a time period no greater than approximately 500 milliseconds.

10. The speed control of claim 2 wherein comparator circuit maintains the actual motor speed to be approximately within one percent of the desired motor speed.

11. A speed control for a universal AC/DC motor responsive to an AC signal from a source of AC power, the speed control comprising:

a speed command circuit selectively providing one of a plurality of speed command signals having a reference frequency representing one of a plurality of selectable desired speeds of the motor;

a feedback circuit responsive to rotation of the motor and producing a feedback signal having a feedback frequency representing an actual speed of the motor;

a phase detector responsive to the one of the plurality of speed command signals and the feedback signal and producing a phase error signal as a function of a phase difference between the reference frequency and the feedback frequency;

a diode bridge and filter circuit coupled to the output of the phase detector for generating an analog DC signal responsive to the phase error signal representative of the average phase error;

an analog reference circuit responsive to the AC signal and iteratively providing ramp signals synchronized with each zero crossing of the AC signal;

a pulse generator responsive to the ramp signal and the average phase error signal for producing a series of trigger pulses having a frequency of occurrence determined by the ramp signals, and each trigger pulse being initiated during a respective ramp signal as a function of the phase error signal; and a triac power switch connected between the source of AC power and the motor to control the application of the AC signal to the motor, the triac power switch having a trigger input responsive to the trigger pulses to control the switching of the triac power switch, whereby the AC signal is applied to the motor as a function of the error signal thereby causing the actual motor speed to be approximately equal to the one of the plurality of desired motor speeds.

12. The speed control of claim 11 wherein the phase detector is a tri-state phase comparator producing a series of pulses including positive pulses representing a first phase difference between the speed command signal and the feedback signal and negative pulses representing a second phase difference between the speed command signal and the feedback signal.

* * * * *